US008265953B2

(12) United States Patent
Elizabeth et al.

(10) Patent No.: US 8,265,953 B2
(45) Date of Patent: *Sep. 11, 2012

(54) MEDICARE PHARMACY CALCULATOR II

(75) Inventors: Megan K. Elizabeth, Louisville, KY (US); Stephen L. Marco, Jr., Louisville, KY (US); Kristen R. Augspurger, Louisville, KY (US); Sarah A. Stephens, Louisville, KY (US); Mark M. Muse, Louisville, KY (US); Srinath S. Iyengar, Louisville, KY (US); Jason P. Loehr, Louisville, KY (US); David L. Townsend, Louisville, KY (US)

(73) Assignee: Humana Inc., Louisville, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/975,924

(22) Filed: Dec. 22, 2010

(65) Prior Publication Data
US 2011/0093289 A1    Apr. 21, 2011

Related U.S. Application Data

(63) Continuation of application No. 11/869,339, filed on Oct. 9, 2007, now Pat. No. 7,860,732, which is a continuation-in-part of application No. 11/127,857, filed on May 12, 2005.

(60) Provisional application No. 60/829,528, filed on Oct. 14, 2006.

(51) Int. Cl.
G06Q 10/00    (2006.01)
G06Q 50/00    (2006.01)
(52) U.S. Cl. .............................. 705/2; 705/3
(58) Field of Classification Search .................. 705/2–4; 703/22
See application file for complete search history.

(56) References Cited

U.S. PATENT DOCUMENTS

| 2005/0010446 | A1 | 1/2005 | Lash et al. |
| 2005/0261939 | A1 | 11/2005 | Augspurger et al. |
| 2006/0041487 | A1* | 2/2006 | Santalo et al. .................. 705/30 |
| 2006/0064332 | A1 | 3/2006 | Schoenbaum et al. |
| 2007/0043595 | A1 | 2/2007 | Pederson |

OTHER PUBLICATIONS

"Calculating cost to and through The Part D Doughnut Hole" to The Center for Medicare & Medicaid Services, http://web.archive.org/web/20060113053547/http://www.medicare.gov/, pp. 1-4, 13 paragraphs.
Bennett, Greta L., Rising to the challenge: Prescription refills in Iraq, Nov. 2004, Healthcare Purchasing News, vol. 28, No. 11, p. 72.

* cited by examiner

*Primary Examiner* — Luke Gilligan
(74) *Attorney, Agent, or Firm* — Standley Law Group LLP

(57) ABSTRACT

A method and apparatus for providing a Medicare Part D Pharmacy Benefits Calculator. A computer user inputs data for prescriptions to be purchased by a prospective insured for a plan period. The prescription data includes a quantity, a days supply, and a number of fills. The data for each prescription the user enters is used to calculate anticipated out-of-pocket costs for the prescriptions for one or more pharmacy benefits plans available to the prospective insured. The cost data is presented to the user in a way that illustrates how out-of-pocket costs will vary over the course of a plan period. The user may view costs for alternative drugs and alternatives sources of drugs. The user may vary and expand the presentation of the cost data to better understand the available plan benefits. The invention helps prospective insureds decide among alternative Medicare Part D pharmacy benefits plans offered by one or more insurance companies.

28 Claims, 28 Drawing Sheets

MY DRUG LIST

140—

If your drugs have any of these special requirements, please click "View Coverage Details"

This tool provides useful information to help you review plans based on your current drug needs. The drug costs displayed are estimates and may vary based on the specific quantity, strength and/or dosage of the medication, the order in which you purchase your prescriptions, and the pharmacy you use. But it also is important to look beyond your current needs at the insurance value of Medicare prescription drug coverage. Enrolling now gives you peace of mind because the coverage will be there even if your drug needs become more significant in the future. And any time you spend out-of-pocket more than $3,600 in a year, Medicare will pay almost all of your remaining drug costs.

Learn more about Medicare Advantage plans by calling:
1-800-833-6578
Monday-Friday, 7a.m. to 10 p.m., Eastern Time and Saturday & Sunday, 7 a.m. to 5:30 p.m., Eastern Time.
Speech and hearing impaired call: TDD 1-877-833-4486
This website is for individual Medicare Coverage only.
Medicare-approved HMO, PPO and PFFS plans available to anyone enrolled in Part B and entitled to Part A of Medicare through age or disability who continues to pay Medicare applicable premiums.
A Medicare approved Prescription Drug Plan available to anyone entitled to Part A and/or enrolled in Part B of Medicare through age or disability who continues to pay Medicare applicable premiums.
Copayment, service area and benefit limitations apply.

Contact Us | Legal | Internet Privacy Statement | Privacy Practices | Licensure | En Español

FIG-1B

View Monthly Drug Costs

Below is the cost information for your list of drugs with PDP Standard S5884-061 Prescription Drug Plan.

Your drug costs may vary based on the order in which you purchase your prescriptions, the day supply, and the pharmacy you use.

| Rx Costs | Stage 1 $0-$250 | Stage 2 $251-$2250 | Stage 3 Over $2250 | Stage 4 Over $3600 |
|---|---|---|---|---|
| Rx Type | You Pay | You Pay | You Pay | You Pay* |
| Generic | 100% | 25% | 100% | 5% |
| Preferred Brand | 100% | 25% | 100% | 5% |
| Non-preferred Brand | 100% | 25% | 100% | 5% |
| Specialty | 100% | 25% | 100% | 5% |

FIG-4A

VIEW MONTHLY DRUG COSTS

| Rx Costs | | | | |
|---|---|---|---|---|
| Rx Type | Stage 1 $0-$250 You Pay | Stage 2 $251-$2250 You Pay | Stage 3 Over $2250 You Pay | Stage 4 Over $3600 You Pay* |
| Generic | 100% | 25% | 100% | 5% |
| Preferred Brand | 100% | 25% | 100% | 5% |
| Non-preferred Brand | 100% | 25% | 100% | 5% |
| Specialty | 100% | 25% | 100% | 5% |

| Month | Prescriptions | You Pay | Total You Pay |
|---|---|---|---|
| | | | Stage 1 Begins |
| Month 1 | LIPITOR 10 MG TABLET | $75.41 | $75.41 |
| Month | Prescriptions | You Pay | Total You Pay |
| | PROCRIT 40,000 UNITS/ML VIAL | $263.29 | $388.70 |
| | | | Stage 2 Begins |
| Month 2 | LIPITOR 10 MG TABLET | $18.85 | $357.55 |
| | PROCRIT 40,000 UNITS/ML VIAL | $132.35 | $489.90 |
| Month | Prescriptions | You Pay | Total You Pay |
| Month 3 | LIPITOR 10 MG TABLET | $18.85 | $508.75 |
| | PROCRIT 40,000 UNITS/ML VIAL | $132.35 | $641.10 |
| Month | Prescriptions | You Pay | Total You Pay |
| Month 4 | LIPITOR 10 MG TABLET | $18.85 | $659.95 |
| | | | Stage 3 Begins |

FIG-4B

VIEW MONTHLY DRUG COSTS — 420

| Month | Prescriptions | You Pay | Total You Pay |
|---|---|---|---|
| Month 4 | LIPITOR 10 MG TABLET | $18.85 | $659.95 |
| | | Stage 3 Begins | |
| | PROCRIT 40,000 UNITS/ML VIAL | $259.28 | $919.23 |

| Month | Prescriptions | You Pay | Total You Pay |
|---|---|---|---|
| Month 5 | LIPITOR 10 MG TABLET | $75.41 | $994.64 |
| | PROCRIT 40,000 UNITS/ML VIAL | $529.40 | $1,524.04 |

| Month | Prescriptions | You Pay | Total You Pay |
|---|---|---|---|
| Month 6 | LIPITOR 10 MG TABLET | $75.41 | $1,599.45 |
| | PROCRIT 40,000 UNITS/ML VIAL | $529.40 | $2,128.85 |

| Month | Prescriptions | You Pay | Total You Pay |
|---|---|---|---|
| Month 7 | LIPITOR 10 MG TABLET | $75.41 | $2,204.26 |
| | PROCRIT 40,000 UNITS/ML VIAL | $529.40 | $2,733.66 |

| Month | Prescriptions | You Pay | Total You Pay |
|---|---|---|---|
| Month 8 | LIPITOR 10 MG TABLET | $75.41 | $2,809.07 |
| | PROCRIT 40,000 UNITS/ML VIAL | $529.40 | $3,338.47 |

| Month | Prescriptions | You Pay | Total You Pay |
|---|---|---|---|
| Month 9 | LIPITOR 10 MG TABLET | $75.41 | $3,413.88 |
| | | Stage 4 Begins | |
| | PROCRIT 40,000 UNITS/ML VIAL | $203.28 | $3,617.16 |

VIEW MONTHLY DRUG COSTS

| Month | Prescriptions | You Pay | Total You Pay |
|---|---|---|---|
| Month 9 | LIPITOR 10 MG TABLET | $75.41 | $3,413.88 |
| | | Stage 4 Begins | |
| | PROCRIT 40,000 UNITS/ML VIAL | $203.28 | $3,617.16 |

| Month | Prescriptions | You Pay | Total You Pay |
|---|---|---|---|
| Month 10 | LIPITOR 10 MG TABLET | $5.00 | $3,622.16 |
| | PROCRIT 40,000 UNITS/ML VIAL | $26.47 | $3,648.63 |

| Month | Prescriptions | You Pay | Total You Pay |
|---|---|---|---|
| Month 11 | LIPITOR 10 MG TABLET | $5.00 | $3,653.63 |
| | PROCRIT 40,000 UNITS/ML VIAL | $26.47 | $3,680.10 |

| Month | Prescriptions | You Pay | Total You Pay |
|---|---|---|---|
| Month 12 | LIPITOR 10 MG TABLET | $5.00 | $3,685.10 |
| | PROCRIT 40,000 UNITS/ML VIAL | $26.47 | $3,711.57 |

| | Total Annual Out-of-Pocket Costs | $3,711.57 |
|---|---|---|

This tool provides useful information to help you review plans based on your current drug needs. The drug costs displayed are estimates and may vary based on the specific quantity, strength and/or dosage of the medication, the order in which you purchase your prescriptions, and the pharmacy you use. But it also is important to look beyond your current needs at the insurance value of Medicare prescription drug coverage. Enrolling now gives you peace of mind because the coverage will be there even if your drug needs become more significant in the future. And any time you spend out-of-pocket more than $3,600 in a year, Medicare will pay almost all of your remaining drug costs.
*For this threshold, there is a variable payment. This payment is as follows: For Generic drugs, the payment is $2 or 5%, whichever is greater. For Preferred Brand, Non-Preferred Brand and Specialty Rx drugs, the payment is $5 or 5%, whichever is greater.

FIG-4D

VIEW MONTHLY DRUG COSTS — 510

| Rx Costs | | | | |
|---|---|---|---|---|
| Rx Type | Stage 1 $0–$250 You Pay | Stage 2 $251–$2250 You Pay | Stage 3 Over $2250 You Pay | Stage 4 Over $3600 You Pay* |
| Generic | $0 | $7 | 100% | 5% |
| Preferred Brand | $30 | $30 | 100% | 5% |
| Non-preferred Brand | $60 | $60 | 100% | 5% |
| Specialty | 25% | 25% | 100% | 5% |

500 — 520

| Month | Prescriptions | You Pay | Total You Pay |
|---|---|---|---|
| | | Stage 1 Begins | |
| Month 1 | LIPITOR 10 MG TABLET | $30.00 | $30.00 |
| | | Stage 2 Begins | |
| | PROCRIT 40,000 UNITS/ML VIAL | $132.35 | $162.35 |
| Month | Prescriptions | You Pay | Total You Pay |
| Month 2 | LIPITOR 10 MG TABLET | $30.00 | $192.35 |
| | PROCRIT 40,000 UNITS/ML VIAL | $132.35 | $324.70 |
| Month | Prescriptions | You Pay | Total You Pay |
| Month 3 | LIPITOR 10 MG TABLET | $30.00 | $354.70 |
| | PROCRIT 40,000 UNITS/ML VIAL | $132.35 | $487.05 |
| Month | Prescriptions | You Pay | Total You Pay |
| | | Stage 3 Begins | |
| Month 4 | LIPITOR 10 MG TABLET | $30.00 | $517.05 |

FIG-5

VIEW MONTHLY DRUG COSTS

Rx Costs

| Rx Type | Stage 1 $0–$250 You Pay | Stage 2 $251–$2250 You Pay | Stage 3 Over $2250 You Pay | Stage 4 Over $3600 You Pay* |
|---|---|---|---|---|
| Generic | $0 | $7 | $7 | 5% |
| Preferred Brand | $30 | $30 | $30 | 5% |
| Non-preferred Brand | $60 | $60 | $60 | 5% |
| Specialty | 25% | 25% | 25% | 5% |

610

Prescriptions

| Month | Prescriptions | You Pay | Total You Pay |
|---|---|---|---|
| | | | Stage 1 Begins |
| Month 1 | LIPITOR 10 MG TABLET | $30.00 | $30.00 |
| | | | Stage 2 Begins |
| | PROCRIT 40,000 UNITS/ML VIAL | $132.35 | $162.35 |
| Month 2 | LIPITOR 10 MG TABLET | $30.00 | $192.35 |
| | PROCRIT 40,000 UNITS/ML VIAL | $132.35 | $324.70 |
| Month 3 | LIPITOR 10 MG TABLET | $30.00 | $354.70 |
| | PROCRIT 40,000 UNITS/ML VIAL | $132.35 | $487.05 |
| Month 4 | LIPITOR 10 MG TABLET | $30.00 | $517.05 |
| | | | Stage 3 Begins |

MY DRUG LIST

Home | Frequently Asked Questions | Glossary

My Drug List
Tips for Using RxCalculator

[ADD A Drug] [VIEW Plan Costs] [VIEW Coverage Details]

Return to Plan Comparison Chart

Can I save Money? Click below for Alternatives
- Top 50 Most Commonly Prescribed Medicare Drugs ⊕ Enlarge text

| Drug Name | Coverage* | Quantity | Days Supply | # of Fills | View Alternatives | Edit Drug | Delete Drug |
|---|---|---|---|---|---|---|---|
| LIPITOR 10 MG TABLET | • Brand<br>• Covered | 30 | 30 | 12 | Can I save money? | Edit | Delete |
| PROCRIT 40,000 UNITS/ML VIAL | • Brand<br>• Covered | 1 | 30 | 12 | Can I save money? | Edit | Delete |

Add a Drug or View Plan Costs

*Some drugs may have special requirements for coverage to ensure that appropriate treatment guidelines are followed. This includes Step Therapy Protocols, Maximum Dispensing Limits, and Prior Authorizations. To see

FIG-7

MONTHLY SUMMARY

‹ Back to My Annual Costs

Rx Calculator℠

AA Enlarge text | ? Help

Monthly Summary

PDP Standard
S5884-061

Your drug costs may vary based on the order in which you purchase your prescriptions, the days supply, and the pharmacy you use.

‹ Back to Rx Plan Costs

Rx Coverage Levels ?

| Rx Costs ? | Stage 1<br>$0-$265 | Stage 2<br>$266-$2400 | Stage 3<br>Over $2400 | Stage 4<br>Over $3850 ? |
|---|---|---|---|---|
| Rx Type ? | You Pay | You Pay | You Pay | You Pay |
| Generic | 100% | 25% | 100% | 5% |
| Preferred Brand | 100% | 25% | 100% | 5% |
| Non-preferred Brand | 100% | 25% | 100% | 5% |
| Specialty | 100% | 25% | 100% | 5% |

— 910
— 912
— 916

| Month | You Pay | Drug Costs ? | Stage ? |
|---|---|---|---|
| January | $349.95 | $604.81 | 2 |
| February | $151.20 | $604.81 | 2 |
| March | $151.20 | $604.81 | 2 |
| April | $165.63 | $604.81 | 3 |
| May | $604.81 | $604.81 | 3 |

Savings Opportunities

Mail Order

*Right Source*

Possible savings by using
RightSource Mail Order:

MONTHLY SUMMARY

Monthly Summary
PDP Standard
S5884-061

Your drug costs may vary based on the order in which you purchase your prescriptions, the days supply, and the pharmacy you use.

| Rx Costs ? | Rx Coverage Levels ? | | | |
|---|---|---|---|---|
| Rx Type ? | Stage 1 $0-$265 You Pay | Stage 2 $266-$2400 You Pay | Stage 3 Over $2400 You Pay | Stage 4 Over $3850 ? You Pay |
| Generic | 100% | 25% | 100% | 5% |
| Preferred Brand | 100% | 25% | 100% | 5% |
| Non-preferred Brand | 100% | 25% | 100% | 5% |
| Specialty | 100% | | | |

| Month | You Pay ? | Drug Costs ? | Stage ? |
|---|---|---|---|
| January | $349.95 | $604.81 | 2 |
| February | $151.20 | $604.81 | 2 |
| March | $151.20 | $604.81 | 2 |
| April | $165.63 | $604.81 | 3 |
| May | $604.81 | $604.81 | 3 |
| June | $604.81 | $604.81 | 3 |
| July | $604.81 | $604.81 | 3 |
| August | $604.81 | $604.81 | 3 |
| September | $604.81 | $604.81 | 4 |
| October | $37.81 | $604.81 | 4 |
| November | $31.82 | $604.81 | 4 |
| December | $31.82 | $604.81 | 4 |
| You Pay Total for the Plan Year: | $3,943.48 | | |
| Total Drug Costs for the Plan Year: | $7,257.72 | | |

Savings Opportunities
Mail Order

*Right Source*

Possible savings by using RightSource Mail Order:

$49.04 estimated savings per year

Return to My Drug List page and Edit your prescriptions for mail-order pricing.

FIG-9B

VIEW Rx DETAILS

< Back to My Annual Costs

Rx Calculator℠

Rx Details
PDP Standard
S5884-061

Your drug costs may vary based on the order in which you purchase your prescriptions, the days supply, and the pharmacy you use.

ᴀA Enlarge text | ? Help

◁ Back to Rx Plan Costs

Rx Coverage Levels ?

| Rx Costs ? | Stage 1 $0-$265 | | Stage 2 $266-$2400 | | Stage 3 Over $2400 | | Stage 4 Over $3850 | |
|---|---|---|---|---|---|---|---|---|
| Rx Type ? | You Pay | | You Pay | | You Pay | | You Pay | |
| Generic | 100% | | 25% | | 100% | | 5% | |
| Preferred Brand | 100% | | 25% | | 100% | | 5% | |
| Non-preferred Brand | 100% | | 25% | | 100% | | 5% | |
| Specialty | 100% | | 25% | | 100% | | 5% | |

| January | Prescriptions | Fill ? | You Pay ? | Drug Costs ? | Stage ? |
|---|---|---|---|---|---|
| • Monthly You Pay: $349.95 • Monthly Drug Costs: $604.81 | LIPITOR 10 MG TABLET | Retail | $75.41 | $75.41 | 1 |
| | PROCRIT 40,000 UNITS/ML VIAL | Retail | $274.54 | $529.40 | 2 |

1010 (points to Rx Coverage Levels table)
1020 (points to January prescriptions table)

VIEW Rx DETAILS

| March | Prescriptions | Fill ⓘ | You Pay ⓘ | Drug Costs ⓘ | Stage ⓘ |
|---|---|---|---|---|---|
| • Monthly You Pay: $151.20<br>• Monthly Drug Costs: $604.81 | LIPITOR 10 MG TABLET | Retail | $18.85 | $75.41 | 2 |
| | PROCRIT 40,000 UNITS/ML VIAL | Retail | $132.35 | $529.40 | 2 |

| April | Prescriptions | Fill ⓘ | You Pay ⓘ | Drug Costs ⓘ | Stage ⓘ |
|---|---|---|---|---|---|
| • Monthly You Pay: $165.63<br>• Monthly Drug Costs: $604.81 | LIPITOR 10 MG TABLET | Retail | $18.85 | $75.41 | 2 |
| | PROCRIT 40,000 UNITS/ML VIAL | Retail | $146.78 | $529.40 | 3 |

| May | Prescriptions | Fill ⓘ | You Pay ⓘ | Drug Costs ⓘ | Stage ⓘ |
|---|---|---|---|---|---|
| • Monthly You Pay: $604.81<br>• Monthly Drug Costs: $604.81 | LIPITOR 10 MG TABLET | Retail | $75.41 | $75.41 | 3 |
| | PROCRIT 40,000 UNITS/ML VIAL | Retail | $529.40 | $529.40 | 3 |

| June | Prescriptions | Fill ⓘ | You Pay ⓘ | Drug Costs ⓘ | Stage ⓘ |

FIG-10C

VIEW Rx DETAILS

| | Prescriptions | Fill (?) | You Pay (?) | Drug Costs (?) | Stage (?) |
|---|---|---|---|---|---|
| June<br>• Monthly You Pay: $604.81<br>• Monthly Drug Costs: $604.81 | LIPITOR 10 MG TABLET | Retail | $75.41 | $75.41 | 3 |
| | PROCRIT 40,000 UNITS/ML VIAL | Retail | $529.40 | $529.40 | 3 |
| July<br>• Monthly You Pay: $604.81<br>• Monthly Drug Costs: $604.81 | LIPITOR 10 MG TABLET | Retail | $75.41 | $75.41 | 3 |
| | PROCRIT 40,000 UNITS/ML VIAL | Retail | $529.40 | $529.40 | 3 |
| August<br>• Monthly You Pay: $604.81<br>• Monthly Drug Costs: $604.81 | LIPITOR 10 MG TABLET | Retail | $75.41 | $75.41 | 3 |
| | PROCRIT 40,000 UNITS/ML VIAL | Retail | $529.40 | $529.40 | 3 |
| September | Prescriptions | Fill (?) | You Pay (?) | Drug Costs (?) | Stage (?) |

FIG-10D

VIEW Rx DETAILS

| September | Prescriptions | Fill ⓘ | You Pay ⓘ | Drug Costs ⓘ | Stage ⓘ |
|---|---|---|---|---|---|
| • Monthly You Pay: $604.81<br>• Monthly Drug Costs: $604.81 | LIPITOR 10 MG TABLET | Retail | $75.41 | | 3 |
| | PROCRIT 40,000 UNITS/ML VIAL | Retail | $529.40 | | 3 |
| October | Prescriptions | Fill ⓘ | You Pay ⓘ | Drug Costs ⓘ | Stage ⓘ |
| • Monthly You Pay: $37.81<br>• Monthly Drug Costs: $604.81 | LIPITOR 10 MG TABLET | Retail | $11.34 | $75.41 | 4 |
| | PROCRIT 40,000 UNITS/ML VIAL | Retail | $26.47 | $529.40 | 4 |
| November | Prescriptions | Fill ⓘ | You Pay ⓘ | Drug Costs ⓘ | Stage ⓘ |
| • Monthly You Pay: $31.82<br>• Monthly Drug Costs: $604.81 | LIPITOR 10 MG TABLET | Retail | $5.35 | $75.41 | 4 |
| | PROCRIT 40,000 UNITS/ML VIAL | Retail | $26.47 | $529.40 | 4 |
| December | Prescriptions | Fill ⓘ | You Pay ⓘ | Drug Costs ⓘ | Stage ⓘ |

FIG-10E

VIEW Rx DETAILS

| December | Prescriptions | Fill ⓘ | You Pay ⓘ | Drug Costs ⓘ | Stage ⓘ |
|---|---|---|---|---|---|
| • Monthly You Pay: $31.82<br>• Monthly Drug Costs: $604.81 | LIPITOR 10 MG TABLET | Retail | $5.35 | $75.41 | 4 |
| | PROCRIT 40,000 UNITS/ML VIAL | Retail | $26.47 | $529.40 | 4 |

◁ Back to Rx Plan Costs  OR  View Annual Costs ▷ | You Pay Total for the Plan Year: $3,943.48
Total Drug Costs for the Plan Year: $7,257.72

— 1030

Additional Resources:
- Take the Rx Calculator Tutorial
- 2007 Medicare Drug List
- View the Pharmacy Locator
- Grievance and Appeals Information
- Learn More About RightSource Mail Order (PDF, 274K)

This tool provides useful information to help you review plans based on your current drug needs. The drug costs displayed are estimates and may vary based on the specific quantity, strength and/or dosage of the medication, the order in which you purchase your prescriptions, and the pharmacy you use. But it also is important to look beyond your current needs at the insurance value of Medicare prescription drug coverage. Enrolling now gives you peace of mind because the coverage will be there even if your drug needs become more significant in the future. And any time you spend out-of-pocket more than $3,850 in a year, Medicare will pay almost all of your remaining drug costs.

FIG-10F

VIEW Rx DETAILS

Additional Resources:
- Take the Rx Calculator Tutorial
- 2007 Medicare Drug List
- View the Pharmacy Locator
- Grievance and Appeals Information
- Learn More About RightSource Mail Order (PDF, 274K)

This tool provides useful information to help you review plans based on your current drug needs. The drug costs displayed are estimates and may vary based on the specific quantity, strength and/or dosage of the medication, the order in which you purchase your prescriptions, and the pharmacy you use. But it also is important to look beyond your current needs at the insurance value of Medicare prescription drug coverage. Enrolling now gives you peace of mind because the coverage will be there even if your drug needs become more significant in the future. And any time you spend out-of-pocket more than $3,850 in a year, Medicare will pay almost all of your remaining drug costs.

*For this threshold, there is a variable payment. This payment is as follows: For Generic drugs, the payment is $2.15 or 5%, whichever is greater. For Preferred Brand, Non-Preferred Brand and Specialty Rx drugs, the payment is $5.35 or 5%, whichever is greater.

Monday-Friday, 7 a.m. to 10 p.m., Eastern Time and Saturday & Sunday, 7 a.m. to 5:30 p.m., Eastern Time.

Contact Us | Legal | Internet Privacy Statement | Privacy Practices | Licensure | En Español

MY Rx COVERAGE

< Back to My Annual Costs      ᴬA Enlarge text | 🖨 Print This Page | ❓ Help

2007 Plan Comparison   3 Plans Available for ZIP code 06906 Change ZIP Code

My Rx Coverage

Use the chart below to compare the out-of-pocket costs you would pay with each plan.*
How To Read This Chart
Explore your personal prescription drug costs with the Rx Calculator.

○ My Available Plans
○ My Rx Coverage
○ My Annual Costs

| Plan Name ❓ | Rx Coverage Levels ❓ (Retail Pharmacy amounts up to 30-day supply) | | | | |
|---|---|---|---|---|---|
| | Rx Costs | Stage 1 $0-$265 | Stage 2 $266-$2400 | Stage 3 Over $2400 | Stage 4 Over $3850 |
| PDP Standard S5884-061 | Rx Type | You Pay | You Pay | You Pay | You Pay** |
| | Generic | 100% | 25% | 100% | 5% |
| | Preferred Brand | 100% | 25% | 100% | 5% |
| | Non-preferred Brand | 100% | 25% | 100% | 5% |
| | Specialty | 100% | 25% | 100% | 5% |
| [Plan Details ▷] | | | | | [Enroll ▷] |
| PDP Enhanced S5884-002 | Rx Costs | Stage 1 $0-$265 | Stage 2 $266-$2400 | Stage 3 Over $2400 | Stage 4 Over $3850 |
| | Rx Type | You Pay | You Pay | You Pay | You Pay** |
| | Generic | $5 | $5 | 100% | 5% |
| | Preferred Brand | $30 | $30 | 100% | 5% |
| [Plan Details ▷] | | | | | [Enroll ▷] |

MY Rx COVERAGE

| Plan Name ⓘ | Rx Coverage Levels ⓘ<br>(Retail Pharmacy amounts up to 30-day supply) | | | | | | | | |
|---|---|---|---|---|---|---|---|---|---|
| PDP Standard<br>S5884-061 | Rx Costs | Stage 1<br>$0–$265 | | Stage 2<br>$266–$2400 | | Stage 3<br>Over $2400 | | Stage 4<br>Over $3850 | Enroll ▷ |
| Plan Details ▷ | Rx Type | You Pay | | You Pay | | You Pay | | You Pay** | |
| | Generic | 100% | | 25% | | 100% | | 5% | |
| | Preferred Brand | 100% | | 25% | | 100% | | 5% | |
| | Non-preferred Brand | 100% | | 25% | | 100% | | 5% | |
| | Specialty | 100% | | 25% | | 100% | | 5% | |
| PDP Enhanced<br>S5884-002 | Rx Costs | Stage 1<br>$0–$265 | | Stage 2<br>$266–$2400 | | Stage 3<br>Over $2400 | | Stage 4<br>Over $3850 | Enroll ▷ |
| Plan Details ▷ | Rx Type | You Pay | | You Pay | | You Pay | | You Pay** | |
| | Generic | $5 | | $5 | | 100% | | 5% | |
| | Preferred Brand | $30 | | $30 | | 100% | | 5% | |
| | Non-preferred Brand | $60 | | $60 | | 100% | | 5% | |
| | Specialty | 25% | | 25% | | 100% | | 5% | |
| PDP Complete<br>S5884-031 | Rx Costs | Stage 1<br>$0–$265 | | Stage 2<br>$266–$2400 | | Stage 3<br>Over $2400 | | Stage 4<br>Over $3850 | Enroll ▷ |
| Plan Details ▷ | Rx Type | You Pay | | You Pay | | You Pay | | You Pay** | |
| | Generic | $5 | | $5 | | $5 | | 5% | |
| | Preferred Brand | $30 | | $30 | | 100% | | 5% | |
| | Non-preferred Brand | $60 | | $60 | | 100% | | 5% | |
| | Specialty | 25% | | 25% | | 100% | | 5% | |

Additional Resources:
- Find a Pharmacy

FIG-11B

MEDICARE PHARMACY CALCULATOR II

CROSS-REFERENCES TO RELATED APPLICATIONS

This application claims the benefit of and incorporates by reference U.S. application Ser. No. 11/127,857, filed May 12, 2005, titled Pharmacy Benefits Calculator, U.S. Provisional Application Ser. No. 60/829,528, filed Oct. 14, 2006, titled Medicare Pharmacy Calculator II, and U.S. application Ser. No. 11/869,339, filed Oct. 9, 2007, titled Medicare Pharmacy Calculator II, now U.S. Pat. No. 7,860,732, issued Dec. 28, 2010.

This application also incorporates by reference all versions of the US government publication entitled "Medicare Marketing Guidelines for: Medicare AdvantagePlans, Medicare Advantage Prescription Drug Plans, Prescription Drug Plans, 1876 Cost Plans," published by the Centers for Medicare & Medicaid Services prior to Oct. 14, 2006.

This application also incorporates by reference: all versions of the web pages in the domain www.humana-medicare.com/ published on the Internet prior to Oct. 14, 2006; the html or other code used to render said web pages on a computer user's work station; and all other web pages linked to or from said Humana-medicare.com web pages; and the html or other code used to render said other web pages on a computer user's work station.

FIELD OF THE INVENTION

The invention is in the field of health insurance.

BACKGROUND

One of the challenges that a consumer faces in controlling their out-of-pocket health care costs is selecting an appropriate health insurance plan. Very often the most economical plan depends upon the particular personal situation of said given consumer. Recently in the United States, a number of new health insurance plans that cover prescription drug costs of persons qualifying for Medicare have become available. These are commonly referred to as "Medicare Part D" plans. These plans are offered by private insurers. The US government reimburses said private insurers for at least a portion of the costs of the plans.

According to the US government web site www.medicare.gov/MPDPF/Shared/Static/Resources.asp (last viewed 28 Sep. 2006):

"All Medicare drug plans will offer at least the standard level of coverage below. Medicare drug plans may design their plans differently as long as what their plan offers is, on average, at least as good as the standard coverage described below. Some plans may offer more coverage for higher premiums.

Standard Coverage (the minimum coverage drug plans must provide):

If you join in 2006, for covered drugs you will pay a monthly premium (varies depending on the plan you choose).

the first $250 per year for your prescriptions. This is called your "deductible."

After you pay the $250 deductible, here's how the costs work:

You pay 25% of your yearly drug costs from $250 to $2,250, and your plan pays the other 75% of these costs, then You pay 100% of your $2,850 in drug costs, then You pay 5% of your drug costs (or a small copayment) for the rest of the calendar year after you have spent $3,600 out-of-pocket.

Your plan pays the rest.

Some plans may be called standard plans but may be designed so that the deductible is lower and the coinsurance is slightly higher. Other plans may charge copayments or set amounts instead of coinsurance.

In general, your out-of-pocket costs should work out to be about the same under these plan designs."

One can think of the above described "Standard Plan" as being divided into 4 stages depending upon the level of benefits received by an insured. These stages are indicated in Table 1 below.

TABLE 1

| Stage | You Pay | Total Yearly Adjudicated Pharmacy Spend | Total out-of-Pocket Costs for Insured | Common Name for Stage |
|---|---|---|---|---|
| Stage 1 | 100% | <$250 | | Deductible |
| Stage 2 | 25% | >$250 <$2250 | | Covered |
| Stage 3 | 100% | >$2850 | | Coverage Gap |
| Stage 4 | 5% or a small copayment (e.g., $2, $5) | | >$3,600 | Catastrophic |

Thus, for example, if an insured had to fill a prescription for a drug that had an adjudicated price of $100, said insured might have an out-of-pocket cost of $100 if he or she were in Stage 1. That cost would drop to $25 when he or she entered into Stage 2. It would increase back to $100 when he or she entered Stage 3. It would drop all the way down to $5 when and if he or she entered Stage 4.

Insurance companies are free to design alternative benefits structures so long as on the average, they provide benefits at least as good as the Standard Plan. For example, an insurance company might provide higher benefits in Stage 3, but at a higher premium.

Furthermore, insurance companies may make the level of benefits for a drug in any given stage a function of the "tier" that the drug is categorized into. Exemplary tiers might include "generic," "preferred brand," "non-preferred brand," and "specialty." Lower tiers might have lower out-of-pocket costs for an insured and higher tiers might have higher out-of-pocket costs. A more complete description of said exemplary tiers can be found at the glossary link found on www.humana-medicare.com/medicare-plans-glossary.asp (last viewed 12 Oct., 2006). Said glossary is incorporated herein by reference.

The complexity of Medicare Part D plans combined with the number of different types of plans available from a given insurer makes it difficult for a prospective insured to make an informed decision as to which plan to enroll in. Thus there is a widely felt need for a means to present a comparison between the expected performances of different plans in a manner that can be widely understood by prospective insureds.

SUMMARY OF THE INVENTION

The Summary of the Invention is provided as a guide to understanding the invention. It does not necessarily describe the most generic embodiment of the invention or all species of the invention disclosed herein.

The present invention is a method and apparatus for providing a Pharmacy Benefits Calculator. The method comprises providing web pages to prospective insureds. Prospective insureds are also referred to herein as "users". At least one of said web pages comprises a table indicating expected pharmacy scripts to be purchased by a prospective insured for an upcoming year or other appropriate period of time. Said table also indicates the anticipated out-of-pocket costs for said scripts for one or more alternative pharmacy benefits plans available to the prospective insured.

The invention further comprises a means for illustrating to a prospective insured how their out-of-pocket costs will vary over the course of a plan year.

The present invention is useful for helping prospective insureds decide among alternative Medicare Part D pharmacy benefits plans offered by one or more insurance companies during an open enrollment period or during a period when said insured first becomes eligible to enroll in Medicare. The present invention also has other utilities.

The present invention may comprise a method and apparatus for allowing a prospective insured to input their anticipated prescriptions for an upcoming plan year so as to more accurately project their anticipated pharmaceutical costs.

The present invention may comprise a method and apparatus for proposing alternative drugs and their anticipated costs to a prospective insured. Said alternative drugs may be generic equivalents and/or have the same therapeutic classification as a given drug but have lower out-of-pocket costs. This is useful for providing information to a prospective insured so that they can discuss the suitability of said alternative drugs with their physician so that said prospective insured can get effective treatment at lower out-of-pocket costs.

The present invention may comprise a method and apparatus for allowing an insured to view the records of their specific pharmaceutical purchases throughout a given plan year. This is useful for allowing an insured to reforecast and manage their pharmacy costs within said plan year.

BRIEF DESCRIPTION OF THE DRAWINGS

FIGS. 1 to 7 present screen shots of embodiment A of a Pharmacy Benefits Calculator.

Figure 10B:
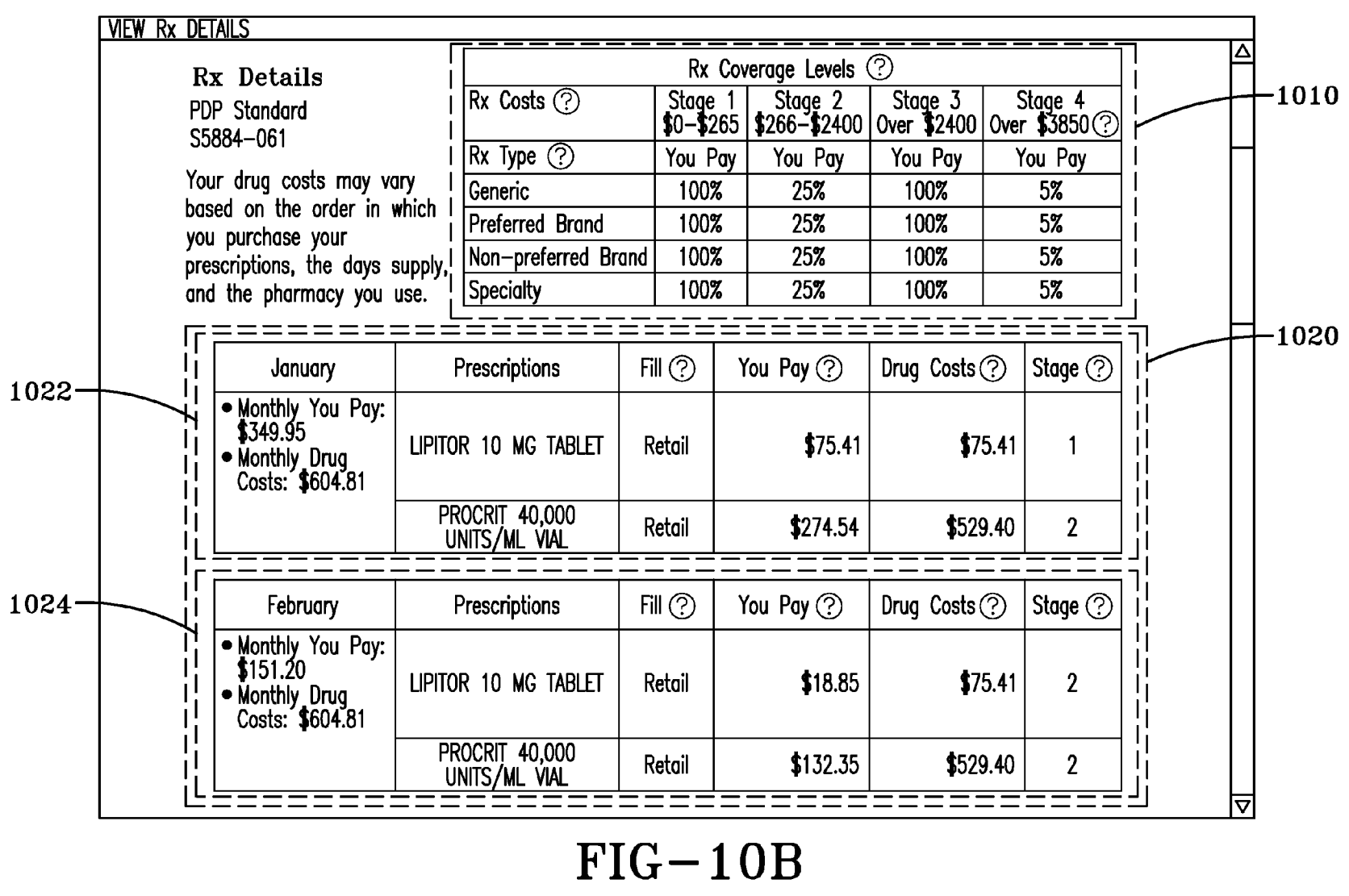

FIGS. 8 to 11 present screen shots of embodiment B of a Pharmacy Benefits Calculator.

FIGS. 1A-1B are screen shots of different portions of a Drug List web page presented to a computer user.

FIG. 2 is a screen shot of the Drug List web page of FIG. 1A after the "enlarge text" hyperlink is clicked.

FIG. 3 is a screen shot of a View Plan Costs page.

FIGS. 4A-4D are screen shots of various portions of a View Monthly Drug Costs web page for a Standard plan.

FIG. 5 is a screen shot of a mid portion of a View Monthly Drug Costs web page for an "Enhanced" plan.

FIG. 6 is a screen shot of a mid portion of a View Monthly Drug Costs web page for a "Complete" plan.

FIG. 7 is the same screen shot as FIG. 1A, but without any identifying boxes, arrows or numerals.

FIG. 8 is a screen shot of an Rx Plan Costs page.

FIGS. 9A-9B are screen shots of various portions of a Monthly Summary page.

FIGS. 10A-10G are screen shots of various portions of an Rx Details page.

FIGS. 11A-11B are screen shots of various portions of a My Rx Coverage page.

DETAILED DESCRIPTION

Figure 1A:
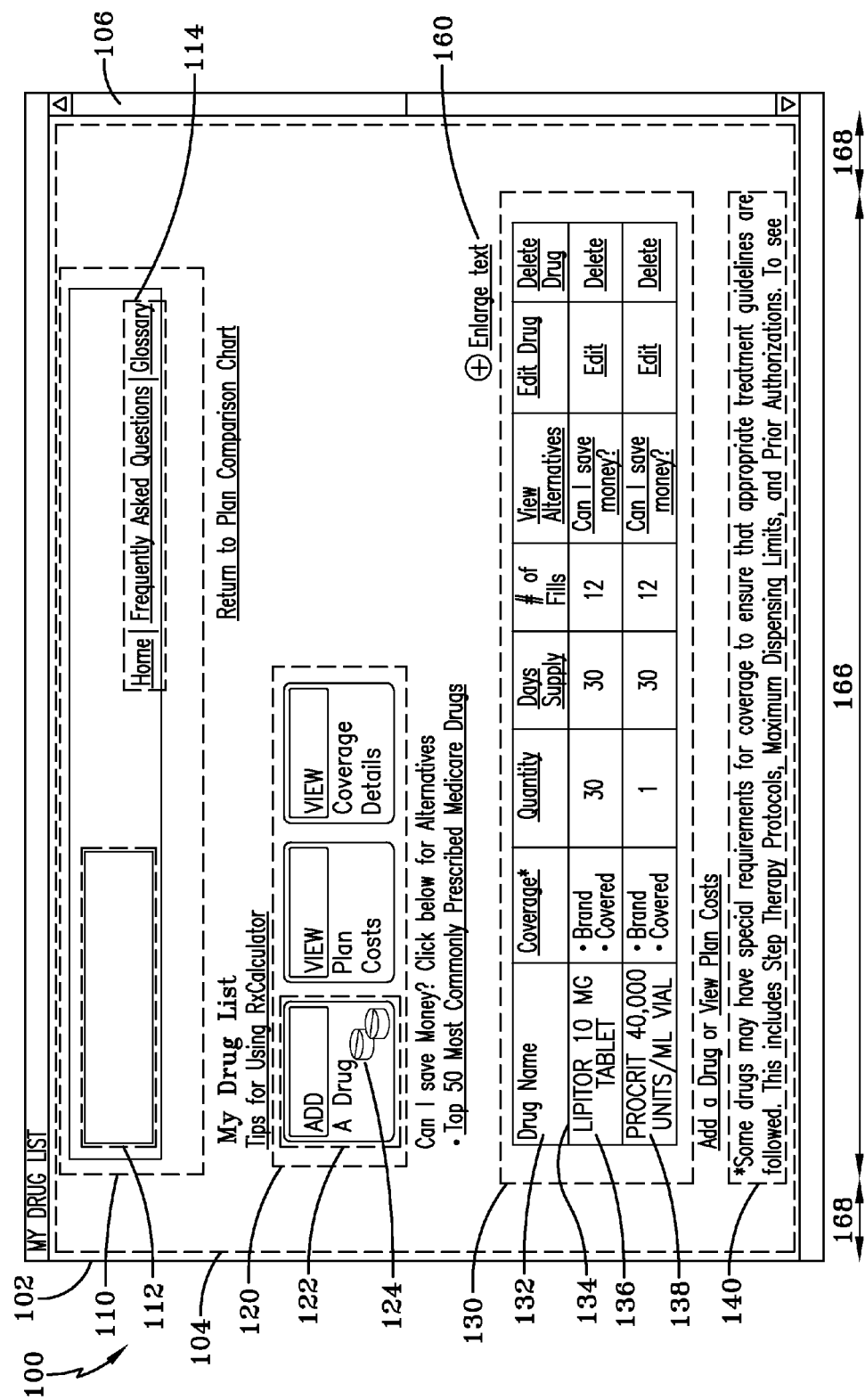

The following detailed description discloses various embodiments and features of the invention. These embodiments and features are meant to be exemplary and not limiting.

Definitions

The definitions provided below are to be applied to their respective terms or phrases as used herein unless the context of a given particular use of a given term or phrase clearly indicates otherwise.

The terms "health insurance," "health care plan," or "benefit plan" refer to an insurance plan that pays benefits to an insured in the event that said insured incurs covered medical costs.

The term "pharmacy benefits plan" or the like refers to an insurance plan that provides benefits to an insured for their covered pharmacy costs. A pharmacy benefits plan may be a subset of a given health insurance plan. A pharmacy benefits plan may also be a stand-alone insurance policy.

The term "plan year" refers to an annual period for which a given health care plan is in force.

The term "Enrollment Event" refers to a period of time that a prospective insured can select their health care plan for an upcoming plan year.

The term "insured" refers to a person who is covered by an insurance policy, such as a health insurance policy.

The term "prospective insured" refers to a person who is considering enrolling in a given insurance plan.

The term "member" refers to a person who is already covered by an insurance policy provided by a given insurance company.

The term "user" refers to a person using a Pharmacy Benefits Calculator.

The term "benefit" or the like refers to money, credit, discount or other consideration provided by an insurance company to an insured as compensation for a covered event.

The phrase "out-of-pocket costs," the abbreviation "OOP," or the like refer to the portion of an insurance claim that is not covered by a pharmacy benefits plan. Said portion would have to be paid by an insured out of his or her own pocket.

The term "Health Plan Wizard" refers to one or more web pages or the like that a prospective insured would use to enroll in a given health insurance plan.

The terms "Pharmacy Benefits Calculator" and "Calculator" refer to a set of one or more web pages or the like which calculates and displays the anticipated out of-pocket pharmacy costs to a given prospective insured under one or more pharmacy benefits plans.

An exemplary Pharmacy Benefits Calculator is described in copending US nonprovisional patent application "Pharmacy Benefits Calculator," US Patent Publication Number 2005-0261939 A1. Said nonprovisional application has been incorporated herein by reference.

The terms "adjudicated cost," "adjudicated price" or the like refer to the amount of money that a given pharmacy is paid for a given script when said script is purchased by a person covered by a given pharmacy benefits plan. The cost is adjudicated in the sense that in order for a pharmacy to determine the price they will paid for a given script when the purchaser is covered by a pharmacy benefits plan, said pharmacy must transmit information to a Pharmacy Benefits Manager, such as Argus Health Systems, Inc. of Kansas City, Mo. Said Pharmacy Benefits Manager then executes an algorithm to determine the price. Said algorithm may take into account the insurance company providing said pharmacy benefits plan, the type of coverage provided by said plan and exceptions to said plan applicable to said insured. Said Pharmacy Benefits Manager then transmits the adjudicated price to said pharmacy along with the amount of out-of-pocket costs that the insured will be charged. The difference between the adjudicated price and the out-of-pocket costs is the amount of money paid by the insurance company to the pharmacy.

An exemplary method of pharmacy claim adjudication is described in copending US nonprovisional patent application "Pharmacy Personal Care Account," US Patent Publication Number 2005-0267784 A1. Said US nonprovisional patent application has been incorporated herein by reference.

As used herein with reference to a Pharmacy Benefits Calculator, the terms "adjudicated," "adjudicated price," adjudicated cost" or the like refer to a price calculated by and simulated adjudication performed by said Pharmacy Benefits Calculator. Said simulated adjudication may give a somewhat different price than an actual adjudication. One reason for this is that a computer user might not specify the pharmacy that they purchase a drug at. In this situation, the Pharmacy Benefits Calculator may use an average pharmacy discount that an insurance company has with at least a portion of their contracted pharmacies.

The terms "script," "prescription," "pharmacy script" and the like refer to an order for a given quantity of a given prescription drug. Drugs that are maintenance drugs are commonly prescribed in one month's supply if purchased at a retail pharmacy and three month's supply if purchased from a mail order pharmacy.

The phrase "Average Wholesale Price" and the abbreviation AWP refer to a national average wholesale price for a given drug at a given time. Said prices are available from pharmacy companies. Compiled lists of average wholesale prices for most drugs available on the market are published by pharmacy data companies, such as First DataBank of San Bruno, Calif.

It is common for insurance companies to negotiate discounts with pharmacies and pharmaceutical companies. Thus when a given pharmacy claim is adjudicated, a discount over the AWP may be applied to determine the adjudicated price. An insured may have a different adjudicated price for the same script depending upon the insurance company they have their coverage with and the pharmacies they choose. These differences can be significant and can be an important factor influencing which insurance company said insured should obtain coverage from.

The term "information system" or the like refers to one or more of computers, servers, input devices, output devices, data storage devices, telecommunications equipment and software. Information systems may communicate with other information systems via telecommunications means, such as the Internet.

Information systems may also communicate with persons via input/output devices. Persons may communicate with other persons using information systems.

Monetary quantities disclosed herein are in US dollars as of October 2006. Said quantities may be converted to other currencies at other times using published exchange rates and appropriate inflation factors. An appropriate inflation factor would be the inflation of the average cost of pharmacy scripts.

The term "personal confidential information" refers to information about a person that is not freely available to the public.

The terms "Group," "level," or "tier" refer to a category assigned to a given script under a given Pharmacy Benefits Plan. Said category is used to determine the coverage of a given script under a given Pharmacy Benefits Plan. "Groups" are generally used with respect an RxImpact® plan or other plan based on allowances for a given script. "Level" or "tier" are generally used with respect to a copay or coinsurance plan. RxImpact® is a trademark of Humana Inc.

Description of Figures

FIGS. 1 to 11 present screen shots of web pages from two exemplary Pharmacy Benefits Calculators suitable for displaying anticipated monthly out-of-pocket costs to a prospective insured. FIGS. 1 to 7 illustrate screen shots from Pharmacy Benefits Calculator A. FIGS. 8 to 11 illustrate screen shots from Pharmacy Benefits Calculator B.

Provisional patent application 60/829,528 has been filed with the USPTO with color versions of said screen shots. Said filing was a pdf document filed electronically. Persons wishing to view the original filing in color may obtain access to said original electronic pdf document through the USPTO.

Exemplary embodiments of the present invention are directed in part to an improved method for displaying the results of a calculation by a Pharmacy Benefits Calculator. The colors used in said presentation provide surprising benefits in terms of ease of apprehension of said results by users. Said colors and their method of presentation, therefore, form part of the invention.

Colors will be described herein using common words such as blue, yellow, orange, green, etc. Shade intensities are described as dark, medium and light. A shade is considered dark if white font presented on said dark shade is readily visible to a person with normal eye sight. A shade is considered light if black font presented on said light shade is readily visible to a person with normal eye sight. A shade is considered medium if both white font and black font are readily visible thereupon.

The exact colors of the screen shots presented herein may be determined from the html code used to paint said pages. Appendix A of provisional application 60/829,528 shows the html code used to paint the web page illustrated in FIGS. 4A to 4D as well as FIGS. 10A to 10G. Thus a person of ordinary skill in the art may determine the exact colors used in said figures by reading said code.

FIG. 1A is exemplary of the screen shots presented herein and the descriptions thereof. Screen shot 100 comprises a web browser 102 and a display field 104. The web browser may be any suitable web browser, such as Microsoft® Internet Explorer.

Within a display field, subfields are demarked by rectangles of dotted lines. Subfield 104 is exemplary. The dotted lines do not form a part of the original display field or the present invention.

Arrows with dotted lines are used to point to one or more elements within a display field. The arrows do not form a part of the original display field or the present invention.

Element numbers are provided outside of a screen shot to label elements within a display field. The numbers do not form a part of the original display field or the present invention.

The web browser 102 comprises a vertical scroll bar 106 if the entire contents of a given web page cannot be viewed within a given display field. The vertical position of the scroll bar indicates the portion of the web page displayed in the display field. The length of the scroll bar indicates the fraction of the web page in view.

FIG. 7 shows the same screen shot as FIG. 1A, but without the boxes, arrows or numbers.

Pharmacy Benefits Calculator A

FIGS. 1 to 7 show screen shots of the Pharmacy Benefits Calculator an embodiment of the present invention.

My Drug List

FIG. 1A shows a screen shot 100 of an exemplary "My Drug List" page of the present invention. This page shows the drugs that a computer user anticipates that he or she will purchase over a subsequent plan year or portion thereof. The page comprises a header 110, navigation icons 120, drug table 130, boilerplate 140, and other elements.

Header 100 is displayed on most pages of the Calculator. The Header may comprise a logo 112 of the insurance company or other provider of the Calculator, hyperlinks 114, or other information, such as a general phone number.

Hyperlinks may be indicated by underlined text. Hyperlinks, such as Home, may take the user to another web page. Hyperlinks, such as Glossary, may provide a pop-up window comprising explanatory text or other functionality.

The navigation bar 120 may comprise one or more iconic hyperlinks 122. Iconic hyperlinks my comprise text or iconic images. The Add A Drug hyperlink 122, for example shows a stylized picture 124 of a pharmaceutical pill.

Drug table 130 comprises rows and columns. Header row 132 shows the titles associated with each row and indicates the nature of the information in the cells therein (e.g., drug identifier, coverage, quantity or number of doses, days supply, number of fills or refills, option to view alternatives, edit option, delete option). The row is dark blue with the lettering in white. The color may be any dark shade including gray. The dark color helps the user unconsciously, or with minimal conscious effort, apprehend that said row is a header row and not a data row.

Row 136 shows data for the first drug in the user's drug list. Said drug is Lipitor® 10 mg tablet. Said drug is a brand drug and covered by the pharmacy benefits plan. Thirty pills form 30 days' supply. The prescription will be filled 12 times.

The hyperlink, Can I Save Money?, indicates to the user that there may be ways to save money on his or her Lipitor prescriptions. Said hyperlink is only displayed if there are generic or therapeutic alternatives to the drug in a given row. If the user were to click on said hyperlink, they would be directed to a web page where they would be presented with generic or therapeutic alternatives to Lipitor. A given user might then consult with his or her health care provider to determine if Lovastatin would indeed be a suitable alternative to treat their condition. If so, then the user might replace the entry for Lipitor with a corresponding prescription for Lovastatin and thus determine if this impacted their choice of health care plan.

An exemplary method for determining a suitable therapeutic or generic alternative for a given drug is described in copending US nonprovisional patent application "Pharmacy Benefits Calculator," US Patent Publication Number 2005-0261939 A1. Said patent application has been incorporated herein by reference.

Hyperlinks are provided in each row to edit a given drug or delete a given drug.

Rows providing data are presented with background colors that are substantially lighter than the header row. This helps set them apart as data rows instead of being a header row.

Adjacent data rows, such as row 136 and 138 may be perceptibly different shades so that a computer user can read across a table easily and not lose track of which row they are reading. Row 136, for example, is light purple. Row 138 is light blue. Different shades of gray are also suitable.

The rows of data are a darker shade than the white background so that the table as a whole is easily seen as a separate entity.

Thin white lines 134 are used to separate rows and columns. This helps the reader focus on the data within the cells as opposed to the cells themselves.

The boilerplate 140 comprises explanatory text and hyperlinks that are normally displayed at the bottom of most pages. FIG. 1B shows the balance of the boilerplate 140.

Size Constraints

In order for an insurance company to participate in the Medicare Part D drug program, it must comply with the rules and regulations governing said program. A Pharmacy Benefits Calculator provided to help a computer user decide which Medicare 20 Part D plan to enroll in, must comply with the Marketing Guidelines promulgated by the Centers for Medicare & Medicaid Services. These marketing guidelines are updated from time to time. The current revision as of the filing of this patent application is the 2nd revision published on Jul. 25, 2006. Said revision has been incorporated herein by reference.

One of the requirements of said guidelines is that web pages must provide information in a font of certain minimum size. This font is 12 point Times New Roman or the equivalent.

This font restriction limits the amount of text and the choice of words that can be presented in a given text box of a given size in a given table. Thus the present invention has been designed using words and phrases within tables that are at least evocative of the contents therein without unduly consuming the available area within a given cell. These words and phrases are often presented as hyperlinks so that the user may click on them for a more complete definition.

It has been found that the web pages of the present invention are easier to use by prospective insureds if the width of the tables is constrained so that all of the columns of a table are visible when displayed on a standard 15 inch monitor. This width limitation is indicated as element 166 (FIG. 1A).

The figures presented herein were captured from display on an 18 inch monitor. Thus blank areas 168 are seen on either side.

It has also been found by surveying prospective insureds in the Medicare eligible population that a substantial fraction of said prospective insureds would like to see the same information displayed in a larger font than the minimum. A suitable larger font is 14 point Times New Roman or the equivalent.

Thus an Enlarge Text hyperlink and associated icon 160 (FIG. 1) is provided on most web pages.

Figure 2:
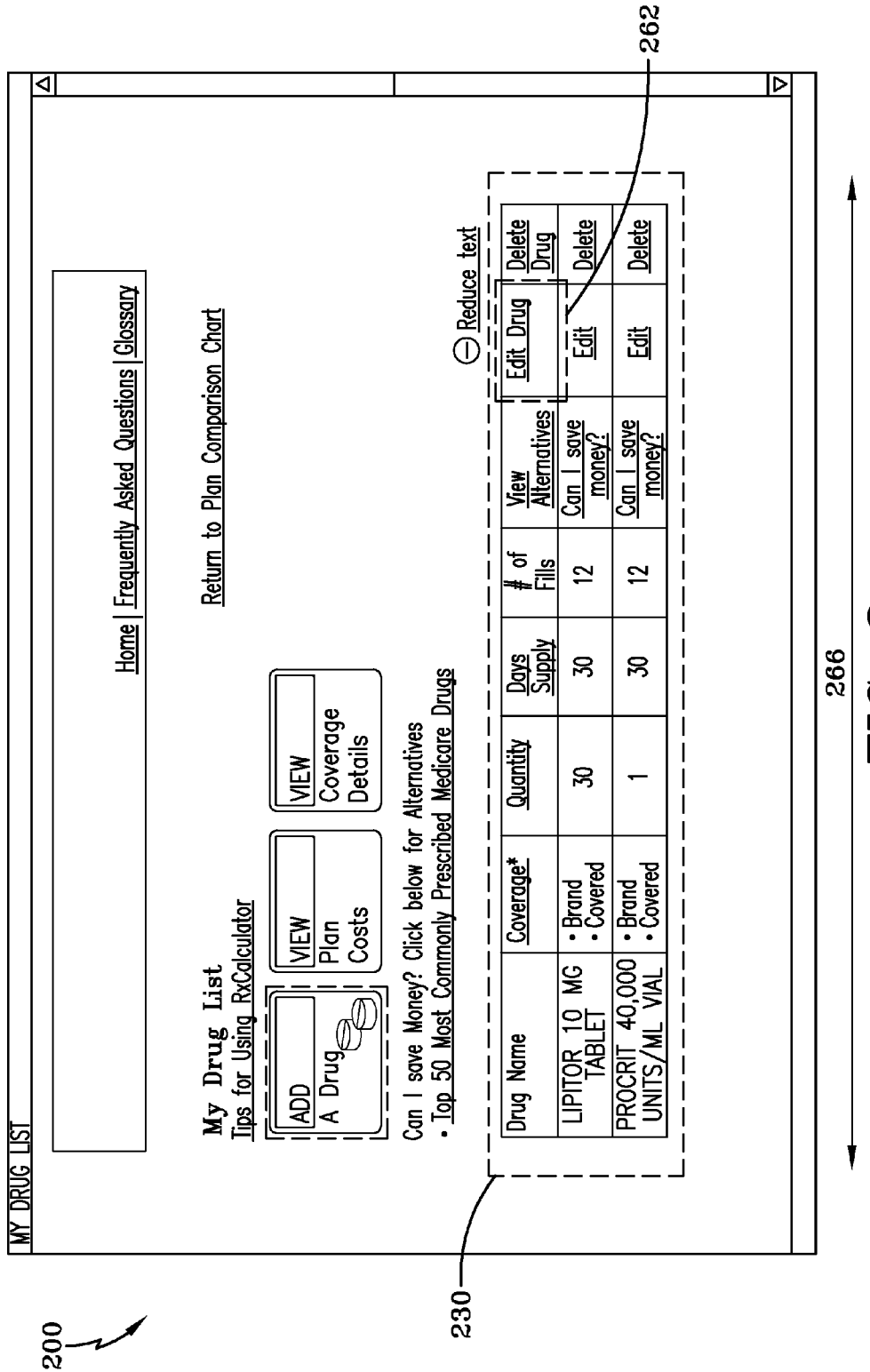

FIG. 2 shows how the My Drug List page of FIG. 1 looks after 200 the Enlarge Text hyperlink has been activated. Within drug table 230, larger text has been used, columns have been resized and words within cells have been wrapped (e.g., 262 "Edit Drug") without being hyphenated or otherwise broken up such that the overall width of the table remains within the limits 266 of allowable width.

The overall page has become longer but the need for horizontal scrolling has been avoided.

The same methods can be applied to tables in languages other than English, such as Spanish. Words displayed within tables and the number of columns within tables are preferably selected so that said tables are displayed within width limits suitable for most display devices without requiring horizontal scrolling.

View Plan Costs

Figure 3:
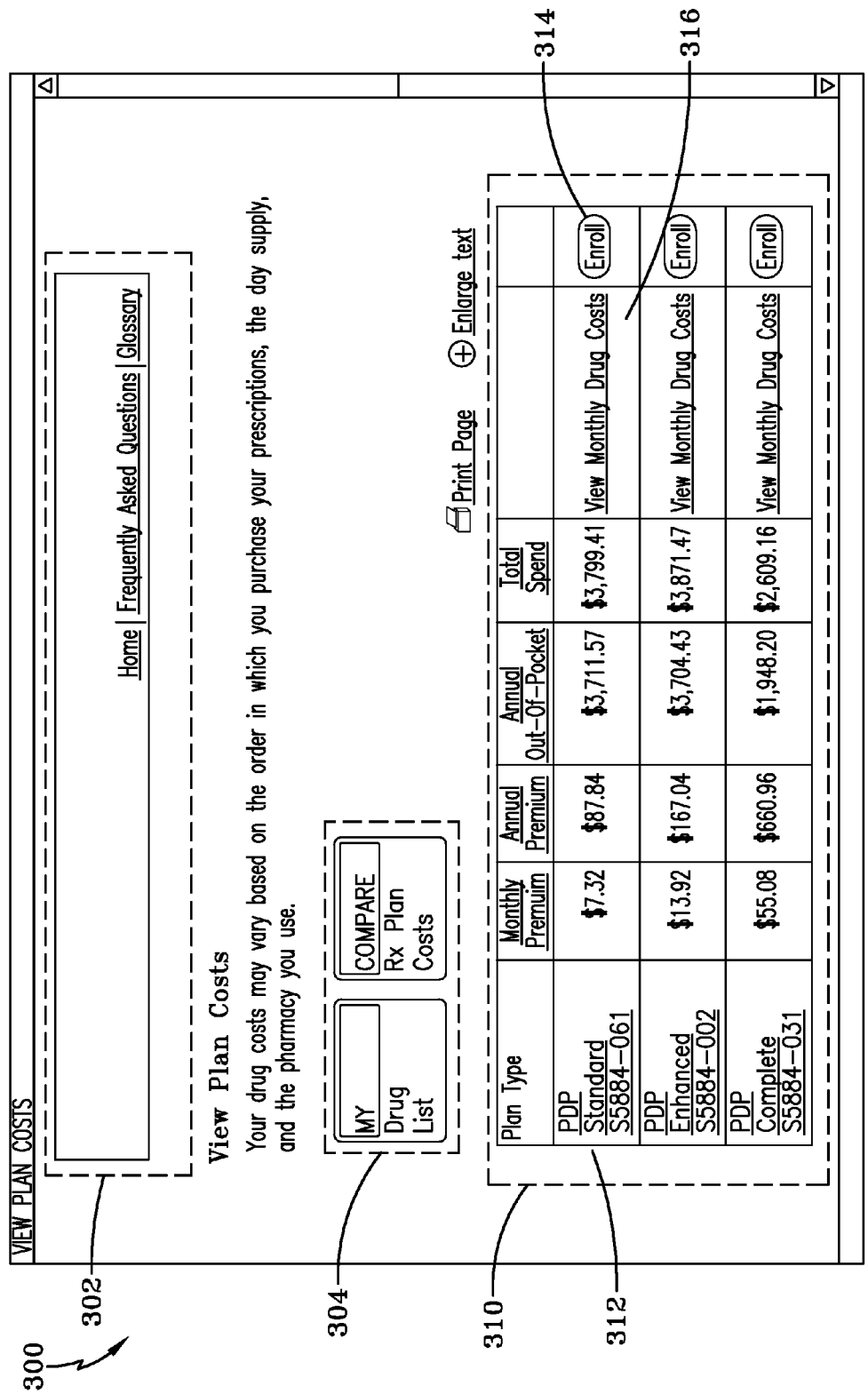

FIG. 3 is a screen shot 300 of a View Plan Costs web page. Said page may be accessed by clicking the View Plan Costs icon of the My Drug List page 100 (FIG. 1A). Said web page comprises a View Plan Costs table 310 similar in design to the Drug Table 130 (FIG. 1A) of the My Drug List page.

The View Plan Costs table presents projected cost data for a given available pharmacy benefits plan in each row. FIG. 3 illustrates data for three Medicare Part D pharmacy benefits plans available from Humana Inc. of Louisville Ky. These plans are "Standard," "Enhanced," and "Complete". The plans are presented in order of increasing monthly premium. Higher premium plans provide higher levels of coverage for drug costs. Both monthly and annual premiums are presented since some prospective insured prefer to look at costs on a monthly basis and some prefer to look at costs on a yearly basis.

Annual Out-of-Pocket costs are presented to indicate the anticipated out-of-pocket costs of the drugs that the user specified in his or her drug list. A Total Spend Column is provided so that users can readily see what their total cost of Premium plus out-of-pocket costs will be.

A View Monthly Drug Costs hyperlink 316 is provided so that users may view their drug costs on a month by month basis.

An Enroll hyperlink 314 is also presented so that a computer user may enroll in a given plan. Thus a computer user may compare plans and then enroll in a desired plan in the same session.

The annual out-of-pocket costs are calculated by adjudicating the anticipated drug claims that the user will have according to the drugs he or she has selected in their Drug List. The adjudication algorithm used by the Calculator is preferably the same algorithm used by the Pharmacy Benefits Company to adjudicate the user's pharmacy claims should he or she enroll in a given pharmacy benefits plan. Suitable algorithms are disclosed in copending US nonprovisional patent applications "Pharmacy Benefits Design," US Patent Publication Number 2007-0043589 A1, "Pharmacy Benefits Calculator," US Patent Publication Number 2005-0261939 A1, "Pharmacy Personal Care Account," US Patent Publication Number 2005-0267784 A1. Each of said applications has been incorporated by reference. Said algorithms may be obtained from said Pharmacy Benefits Managers and incorporated into the information system of the Pharmacy Benefits Calculator. Exemplary algorithms are discussed below with reference to FIGS. 13 to 16.

View Monthly Drug Costs

Screen shots of a View Monthly Drug Costs page are presented in FIGS. 4A to 4D. This page may be accessed by clicking on a View Monthly Drug Costs hyperlink 316 (FIG. 3). The page shown is for a Basic plan.

A Stage Benefits Legend 410 is presented near the top of the page so that it can be seen in the initial view. The Legend is laid out in a table format. The columns 412 are for the different Stages of the pharmacy benefit plan. The rows 416 are for different Rx Types of the drugs that are covered by the plan.

The column headers indicate the Stage number and the range of total adjudicated drug costs that a given stage applies to. Stage 4 is an exception in that the indicated cost range is for the insured's out-of-pocket costs, and not the total adjudicated cost. This explanation is provided in hyperlink 414.

Explanation of the total adjudicated costs are provided in the hyperlink Rx Costs. Explanation of the Rx Type is provided in the hyperlink Rx Type.

Each of the cells in the Stage Benefits Legend gives an indication of the expected out-of-pocket costs (i.e., "You Pay") for a given type of drug purchase (e.g., generic, preferred brand, etc.).

FIG. 4A shows the results for a Standard plan. Thus the benefits levels shown in a given column of the Stage Benefits Legend are the same for all drug types.

In Stage 1, an insured pays 100% of the adjudicated cost of a drug. In Stage 2 he or she pays 25%. In Stage 3 he or she pays 100% and in Stage 4 he or she pays 5%.

The columns of the Stage Benefits Legend are preferably different shades of color. As will be seen below, the color shading will be preserved in the presentation of the month by month individual drug costs. Thus a computer user may readily apprehend why their anticipated out-of-pocket drug costs vary by such a large percentage from one month to the next. This information will help them make a more informed choice in pharmacy benefits plan as well as provide them with a tool for controlling their drug costs.

A suitable set of background shades for the different Stages are presented in Table 2 below.

TABLE 2

| Stage | Background Color | RGB Codes |
| --- | --- | --- |
| Stage 1 | Light Yellow | #FFFFCC |
| Stage 2 | Light Orange | #FFCC66 |
| Stage 3 | Light Green | #CCFF99 |
| Stage 4 | Light Teal | #33CCFF |

Suitable colors for the header rows are shades of gray.

A portion of the Monthly Drug Cost table 420 is visible in FIG. 4A.

FIG. 4B is a screen shot of the Monthly Drug Cost web page with the scroll bar 402 moved down so that the Stage Benefit table 410 is visible as well as an initial portion of the Monthly Drug Cost table 420. The columns of the Monthly Drug Cost table include "Month," "Prescriptions," "You Pay," and "Total You Pay".

"Month" refers to a given month in a plan year. "Prescriptions" lists the scripts that are anticipated to be purchased in a given month. "You Pay" is the out-of-pocket costs for a given script depending upon the Stage the insured is in. "Total You Pay" is a running total of all of the user's anticipated out-of-pocket expenses for drugs.

Each month has a dark blue header row 422. This helps users apprehend the change of months. It is particularly useful when a computer user has five or more medications in a month. It is common, for example, for Medicare recipients to take seven to ten drugs in a given month.

An additional header row 424 is inserted at the beginning of each stage. This header row is color coded according to the Stage Benefit Legend. Each "You Pay" and "Total You Pay" cell is also color coded according to the Stage a given script is adjudicated in.

Occasionally a script will fall into two adjacent Stages. In the example illustrated in FIG. 4B, the script for Procrit® in Month 1 begins in Stage 1 and traverses into Stage 2. Said scripts that fall into two adjacent stages may be color coded as falling into the Stage they land in. This helps the user understand why the out-of-pocket costs for said Script abruptly changed.

In the Standard plan illustrated, the out-of-pocket costs of a script that straddles more than one Stage is adjudicated on a prorated basis. A script for Lipitor® 10 mg has an adjudicated price of $75.41. A script of Procrit has an adjudicated price of $529.40. The first fill of Lipitor, therefore, is fully in Stage 1 and the out-of-pocket costs are the adjudicated price of $75.41. The initial fill of Procrit, however, brings the total out-of-pocket costs above $250. Thus ($250.00-$74.49) or $174.51 of the cost of Procrit falls into Stage 1. The balance, ($529.41-$174.51) or $354.90 falls into Stage 2. When this fill is adjudicated on a prorated basis, the total You Pay is ($174.51 (Stage 1)+0.25*$354.90 (Stage 2)) or $263.29.

The next fill of Procrit 438 falls fully into Stage 2 and the adjudicated out-of-pocket costs are 0.25*$529.41 or $132.35.

Referring to FIG. 4C, one can see a similar header row 442 for the beginning of Stage 3. Procrit again straddles two Stages and has a prorated out-of-pocket cost 444 before attaining its full cost 446 for said Stage.

Referring to FIG. 4D, one can see a header row 452 for the beginning of Stage 4. Procrit again straddles two Stages and has a prorated out-of-pocket cost 454 before attaining its full cost 456 for said Stage.

At the bottom of the page is the total anticipated out-of-pocket costs 458 for the user.

FIG. 5 is a screen shot 500 of a View Monthly Drug Cost page corresponding to the Enhanced plan shown in FIG. 3. The Stage Benefits Legend 510 preserves the Stage color coding, even though the benefits for different types of scripts vary whereas the benefit levels for Stage 1 and Stage 2 are nearly the same. The only difference between the two is that the copayment for generic drugs is $0 in Stage 1 and $7 in Stage 2.

The color coding of Stages is further preserved in the Monthly Drug Cost table 520.

FIG. 6 is a screen shot 600 of a View Monthly Drug Cost page corresponding to the Complete plan shown in FIG. 3. The Stage Benefits Legend 610 preserves the Stage color coding, even though the benefits for different types of scripts varies whereas the benefit levels for Stage 1, Stage 2, and now Stage 3 are nearly the same. The only difference between the first three stages is that the copayment for generic drugs is $0 in Stage 1 and $7 in Stage 2.

The color coding of Stages is further preserved in the Monthly Drug Cost table 620.

It has been surprisingly found through surveys of prospective insureds who are, or soon will be, eligible for Medicare, that the provision of a Stage Benefits Legend combined with the color coding of monthly costs of drugs helps said prospective insureds understand the overall program and make informed decisions on their choice of plan, even when the design of a pharmacy benefits program is significantly different than the Standard Medicare plan.

Pharmacy Benefits Calculator B

FIGS. 8 to 11 present screen shots of an alternative Pharmacy Benefits Calculator B. Calculator B uses essentially the same system and methods for calculating anticipated pharmacy costs as Calculator A. Calculator B, however, presents the results in a different manner.

Rx Plan Costs

Figure 8:
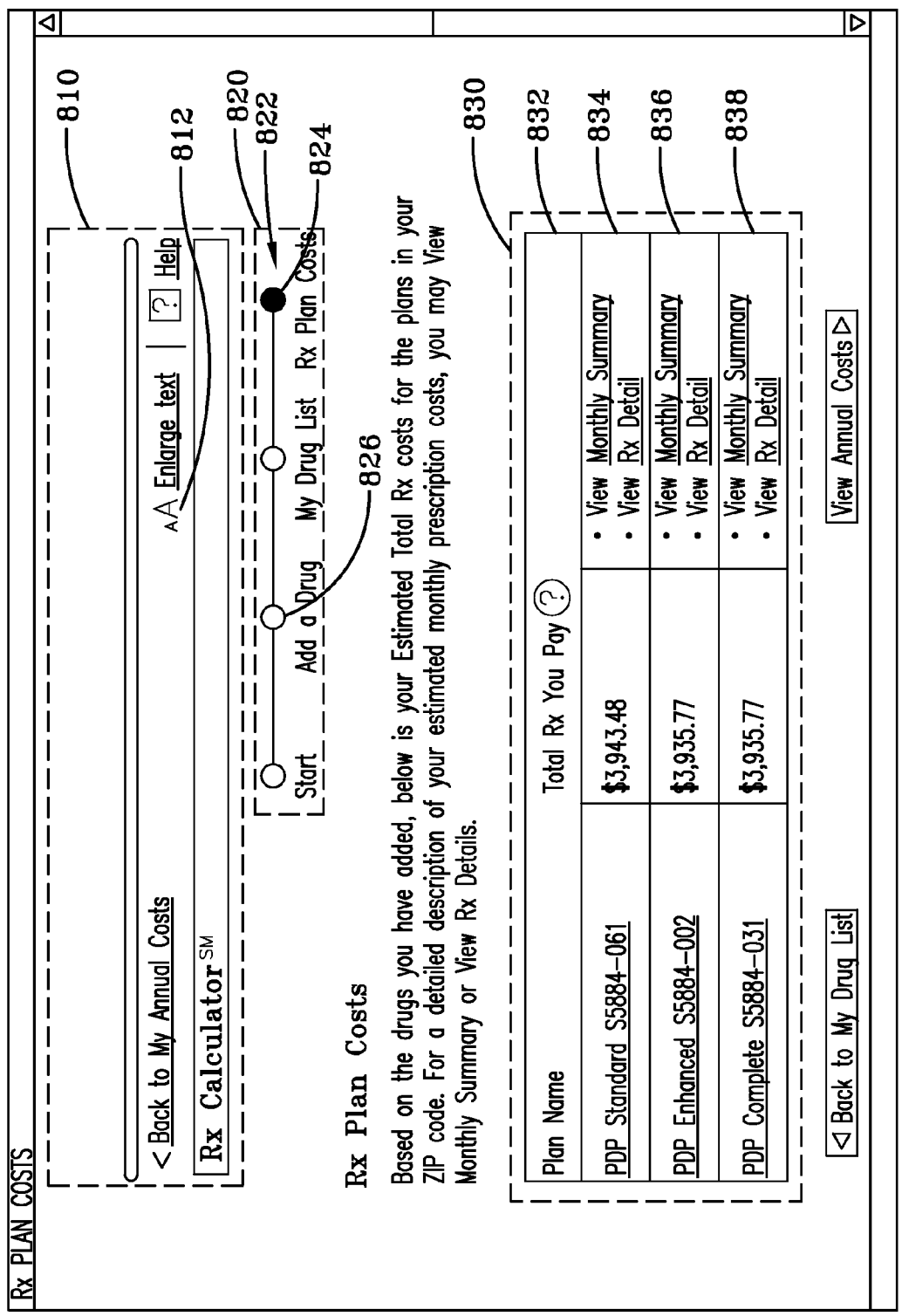

FIG. 8 presents a screen shot 800 of a portion of an Rx Plan Costs page from Calculator B. This page corresponds to the View Plan Costs page of Calculator A presented in FIG. 3.

The Rx Plan Costs page comprises a header 810, navigation icons 820, and View Plan Costs table 830.

A functional difference between the header 810 of Calculator B and the header 302 (FIG. 3) of Calculator A is that an Enlarge Text hyperlink and associated icon 812 has been added. Thus the option of enlarging text is available on all pages of the calculator that comprise the header.

A functional difference between the navigation icons 820 of Calculator B and the navigation icons 304 (FIG. 3) of Calculator A is that the navigation icons are presented as a linear series 822 with the terminus icon 824 indicated as a darker shade than the earlier icons. This indicates to the user which stage they are in using the Calculator. A computer user may navigate back to an earlier stage by clicking on an earlier icon in the series, such as Add a Drug 826.

When the user is on an earlier stage, such as the Add a Drug page, the navigation icons are only shown up to the stage they are in.

The View Plan Costs table 830 of Calculator B comprises three columns. The first column, Plan Name, presents the names of the pharmacy benefits plans available to the user. The second column, Total Rx You Pay, presents the anticipated out-of-pocket costs for the given user's anticipated drug purchases. The third column presents hyperlinks to either a Monthly Summary page or an Rx Detail page so that the user may examine the details of their Total Rx You Pay.

The View Plan Costs table of Calculator B uses similar design methodology as the View Plan Costs table of Calculator A. Relative shading differences between rows provides the functionality of ease of apprehension of the title row and ease of tracking the data in a given row as a computer user reads across said row. The overall shading of the View Plan Costs table 830 of Calculator B, however, is lighter than the corresponding table of Calculator A. The header row 832, for example, is a shade of medium gray. The first row 834 is white. The second row 836 is light gray. The third row 838 is white again. By using lighter shading, the text within the table can all be dark colors, such as black or dark blue. It has been surprisingly found through surveys and focus groups of users that dark text on lighter backgrounds is easier for Medicare eligible persons to read than light text on dark backgrounds.

The lines separating cells in table 830 are thin medium gray. This sets the table off from the background despite the use of white in the rows. The thin medium gray lines also do not distract a computer user from the textual information presented in the table.

Monthly Summary Page

FIGS. 9A-9B present screen shots of successively lower portions of a Monthly Summary page 900 of Calculator B.

The Monthly Summary page 900 comprises a Stage Benefits Legend 910 and a Monthly Summary table 920.

The Stage Benefits Legend 910 of Calculator B is similar to the Stage Benefits Legend 410 (FIG. 4A) of Calculator A. Header row 912 and header column 916, however, are tinted light blue. This helps the user perceive that the background color 914 for Stage 1 is light yellow. Similar principles of contrasting colors can be used for other color schemes used in indicating Stages.

FIG. 9B shows a scrolled down view of Monthly Summary page wherein both the entire Stage Benefit Legend 910 and the entire Monthly Summary table 920 can be viewed in a single screen.

The Monthly Summary table 920 comprises four columns 922 and an information box 924.

The four columns 922 are Month, You Pay, Drug Costs, and Stage. Month is the month of a given plan year. You Pay is the amount of out-of-pocket costs that a computer user can anticipate for their given anticipated drug purchases. Drug Costs are the anticipated drug costs that will be paid for by both the user and the insurance company. Stage is the stage that the user is in at the end of a given month.

In this example, it is anticipated that the user will end his or her first month, January, in Stage 2. The Stage cell for this row, therefore, is shaded light orange. The user is in Stage 2 at the end of the first month due to the fact that his or her anticipated drug costs, $604.81, will be greater than the deductible, $265, for Stage 1.

When viewed as a whole, the Stages column appears to be a progression of shades which stands out from the relatively lighter background. Distance along the column is proportional to the passage of time. Thus a computer user may perceive at a glance when during the year they might enter the different Stages of the Pharmacy Benefits Plan.

The Information Box 924 provides a calculated value 926 of how much money the user could save if they bought their medications through a mail order pharmacy as opposed to a retail pharmacy. It also provides a hyperlink, My Drug List, so that the user may quickly go back and change their preferences so that they can fill their prescriptions by mail order if he or she wants to take advantage of the savings.

Rx Details page

FIGS. 10A-10G present screen shots of successive vertical portions of an Rx Details page 1000 from a Pharmacy Benefits Calculator B. The HTML code used to render said Rx Details page 1000 is presented in Appendix B of provisional application 60/829,528. Thus a person of ordinary skill in the art may reproduce the colors and layout of said page using said HTML code.

An Rx Details page for Calculator B corresponds in part to a View Monthly Drug Costs page 400 (FIG. 4A) for Calculator A.

The Rx Details page comprises a Pharmacy Benefits Legend 1010 and a Monthly Details table 1020.

Referring to FIG. 4B, the Monthly Details table comprises sub-tables corresponding to each month in a given plan year or other period of time. FIG. 4B presents the sub-tables for January 1022 and February 1024.

Each sub-table comprises the columns, Month, Prescriptions, Fill, You Pay, Drug Costs, and Stage.

The column Month has the name of the month in the header row. The cells of the column are merged into a single cell. The single cell presents the calculated values for the total out-of-pocket costs for the user (e.g., $349.95 for January) and anticipated adjudicated drug costs (e.g., $604.81 for January) for that month.

The Prescriptions column shows the name of the scripts in the user's drug list for a given month.

The Fill column shows whether or not the fill will be by retail or mail order.

The You Pay column shows what the user's anticipated out-of-pocket costs will be for a given prescription.

The Drug Costs column shows what the anticipated price for a given drug will be.

The Stage Column shows the Stage that a given prescription ends in. The cells are color coded according to the legend 1010. Thus in this example the first drug, Lipitor, is fully within Stage 1 and thus its Stage cell is light yellow. The second drug Procrit, however, falls across both Stages 1 and 2. Its final stage is Stage 2. Its Stage cell is light orange.

By presenting the Stage column as being fairly wide and with the heights of the rows being fairly tall, the progression from one stage to another is perceived as a progression of time, even though there are sub-table header rows breaking up the column.

FIGS. 10C to 10F show the continued progression of time and advancements through the Stages.

FIGS. 10F and 10G show the boiler plate 1030.

My Rx Coverage

FIGS. 11A and 11B show successive views of a My Rx Coverage page 1100 from a Health Plan Wizard. This page is used to graphically present the coverage levels provided in different Pharmacy Benefits Plans.

A My Rx Coverage page comprises a My Rx Coverage table 1110.

A My Rx Coverage table comprises the columns Plan Name, Rx Coverage Levels, and a third column for enrollment hyperlinks.

The Plan Name column presents the name of the plans available to a given insured. Said eligibility might be determined by the zip code of said insured that was provided when the user initially logged in to the Health Plan Wizard.

The Rx Coverage Levels column presents the Stage Benefits Legends that correspond to the available plans.

The third column provides a link to an enrollment site so that the user may enroll in a given plan.

FIG. 11B presents the Stage Benefits Legends 1112, 1114, 1116 for three available Pharmacy Benefits plans in order of increasing monthly premiums.

Thus a computer user many quickly determine the significant differences in coverage between one plan and another and the anticipated impact of those differences on the premium.

The header column 1118 for each Stage Benefits Legend is light blue. The header rows are light gray. The light blue header column is sufficient for the user to see that the Stage 1 color is light yellow.

Figure 12:
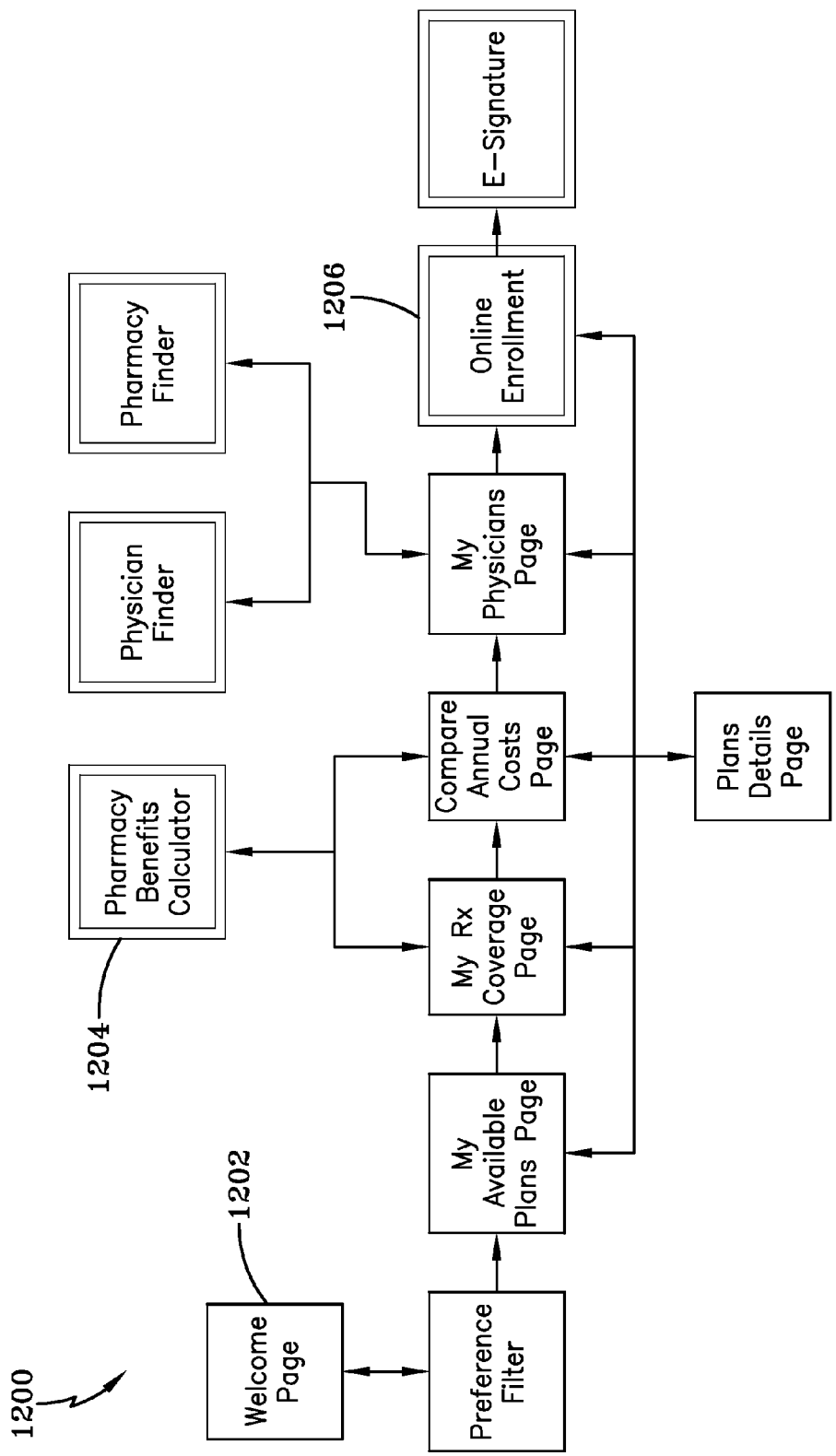
FIG. 12 illustrates navigation linkages between a portion of the individual pages and sub-domains in an exemplary Health Plan Wizard.

Method for Incorporating a Pharmacy Benefits Calculator Into a Health Plan Wizard FIG. 12 illustrates a method for incorporating a Pharmacy Benefits Calculator into a Health Plan Wizard. It shows navigation linkages between a portion of the individual pages and sub-domains in exemplary Health Plan Wizard 1200. Not all pages or sub-domains are shown.

Individual pages are shown as single line rectangles. Welcome Page 1202 is an example.

Sub-domains are shown as double line rectangles. Pharmacy Benefits Calculator 1204 is an example.

The Wizard presented herein is useful for helping prospective insureds determine which Medicare Part D plan, if any, they might want to enroll in. It also has other utility.

The Welcome Page 1202 provides the user with basic information about the Wizard and accepts personal information from the user, such as zip code, to determine what plans are available to said computer user.

The Preference Filter accepts input from the user as to whether or not they want plan information for the current year or the next year. Users would want information about the current year if, for example, they were to become eligible for Medicare during a specific year. They might want information about the next plan year if they wanted to determine if they should change plans in the next calendar year during an open enrollment period.

The My Available Plans page presents the available plans to the user. It might include the plan names, coverage, monthly premiums, annual deductible and maximum out-of-pocket expenses. The plans presented might include those that provide primarily pharmacy benefits as well as those that provide both pharmacy benefits and other health care coverage, such as doctor visits.

The My Rx Coverage page presents additional detail on the benefits levels for the Pharmacy Benefits Plans of each available health care plan. FIGS. 11A-11B discussed above show an exemplary My Rx Coverage page.

The Compare Annual Costs page presents a comparison of different components of the anticipated total annual out-of-pocket costs for each of the different plans available to a computer user. Said components comprise the Plan Name, Plan Premium, Primary Care Physician, Specialists (e.g., surgeon), Hospital costs, Rx Costs and Total costs.

As discussed in more detail below, the Rx Costs would be the anticipated annual costs based on the user's input into a Pharmacy Benefits Calculator.

The My Physicians page shows the physicians that may be used with a given plan.

The Online Enrollment sub-domain 1206 accepts information from a computer user so that said computer user may enroll in a given plan.

The E-signature sub-domain allows a computer user to confirm their enrollment.

Direct two way hyperlinks are provided between pages My Available Plans to the sub-domain Online Enrollment. This allows the user to directly navigate between pages of interest without having to start the process over. They also allow the user to enroll at any point in the process where they are satisfied that they have the information they need to make a decision.

Said pages are also directly linked to a Plan Details page 1208 so that a computer user may examine plan details at any point of the process.

Two way links are provided to a Pharmacy Benefits Calculator from both the My Rx Coverage page and the Compare Annual Costs page. It has been determined by the use of surveys, focus groups and the professional judgment of the Wizard designers that this is the most likely place that a computer user would want to take the time to input their anticipated pharmacy purchases and thus calculate their anticipated pharmacy out-of-pocket expenses. Links to the Pharmacy Benefits Calculator may be provided from other pages in the Wizard as needed.

The Physician Finder is a sub-domain where a computer user can determine if their physician is a member of a given plan.

The Pharmacy Finder serves an analogous purpose for finding pharmacies that are part of a given plan.

Method for Calculating Anticipated Drug Prices

Figure 13:
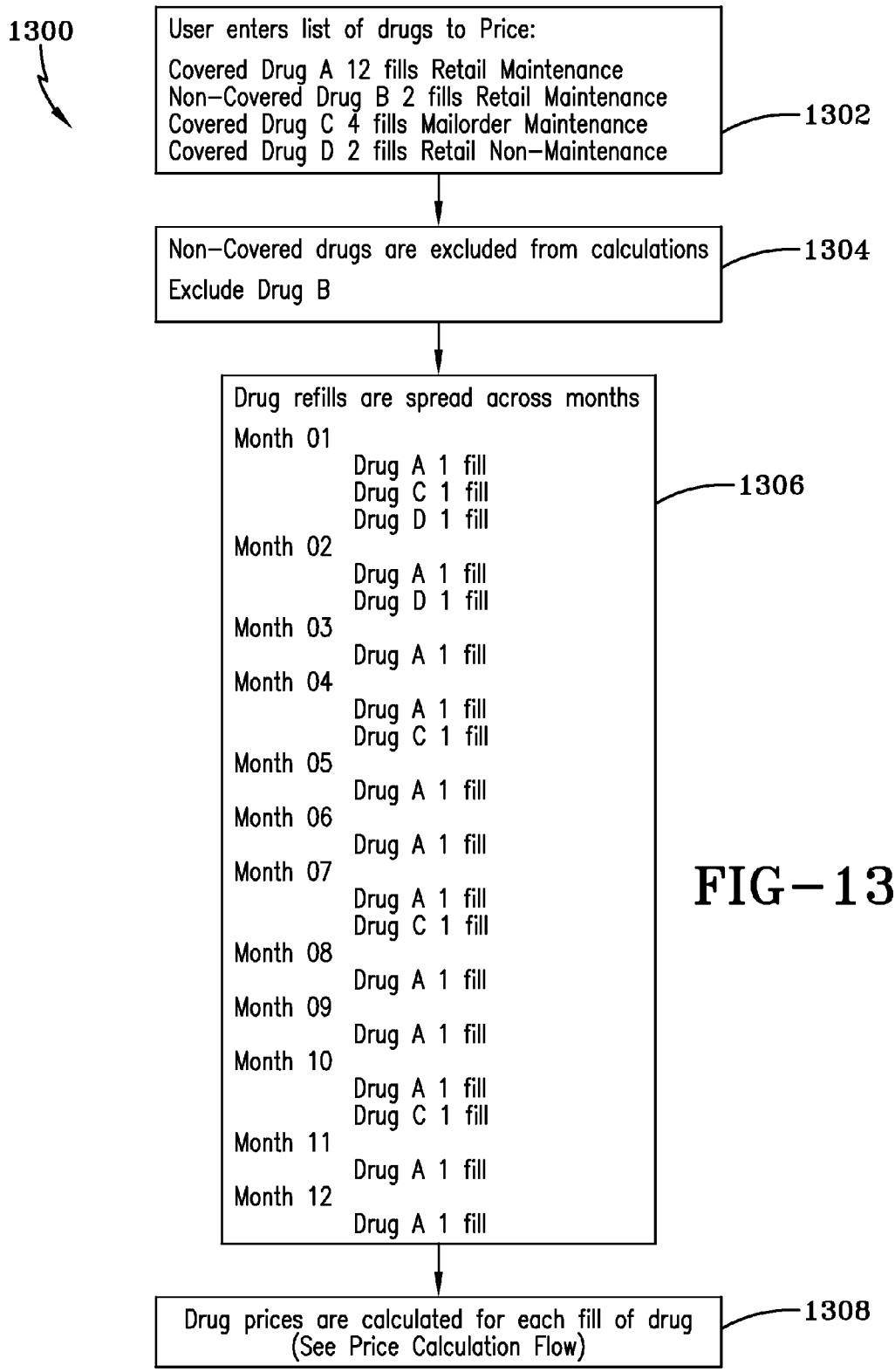
FIG. 13 illustrates the basic flow of drug price calculation for a Pharmacy Benefits Calculator.
Figure 14:
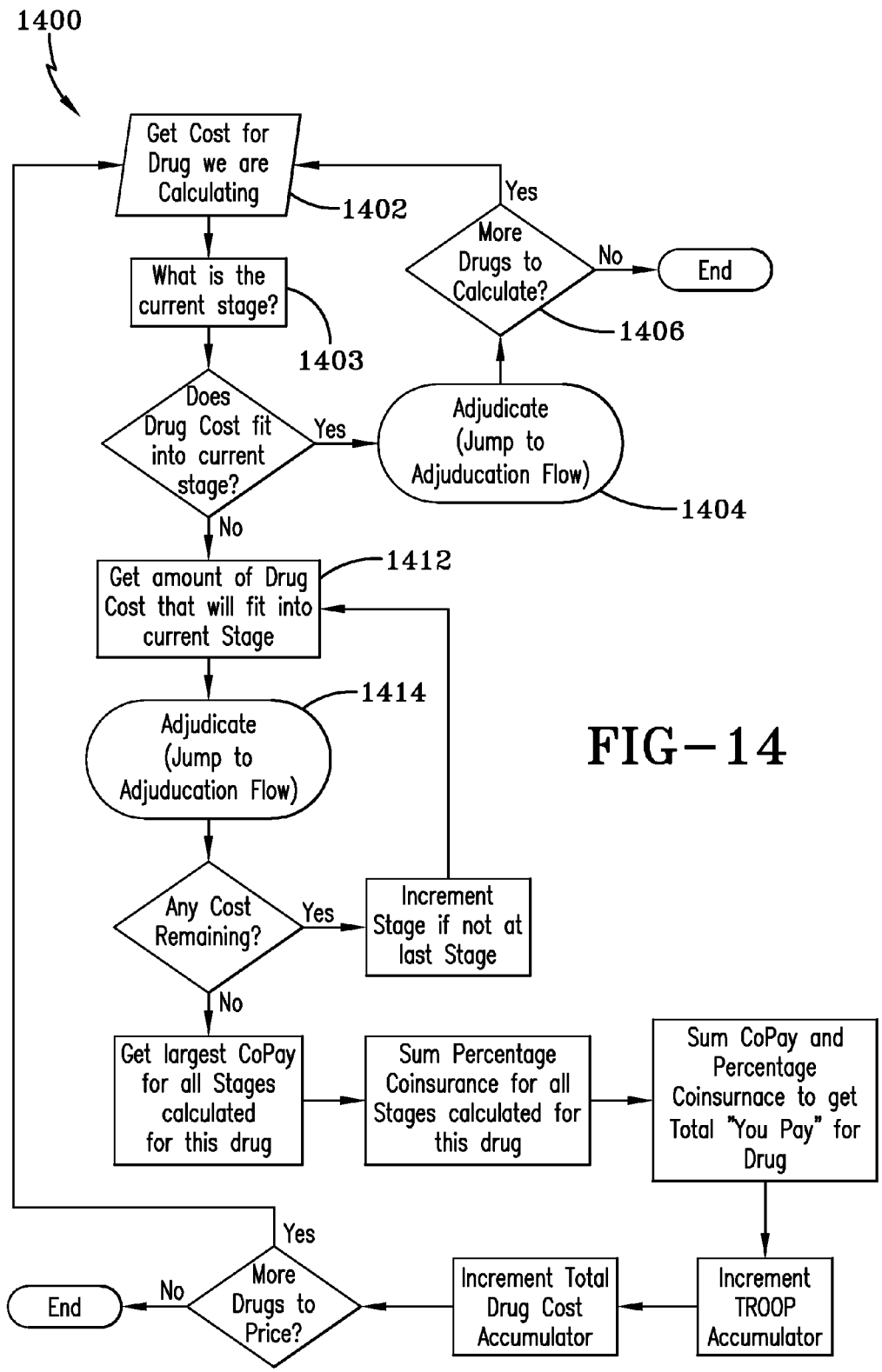
FIG. 14 shows the basic flow for the price calculation step 1308 of FIG. 13.
Figure 15:
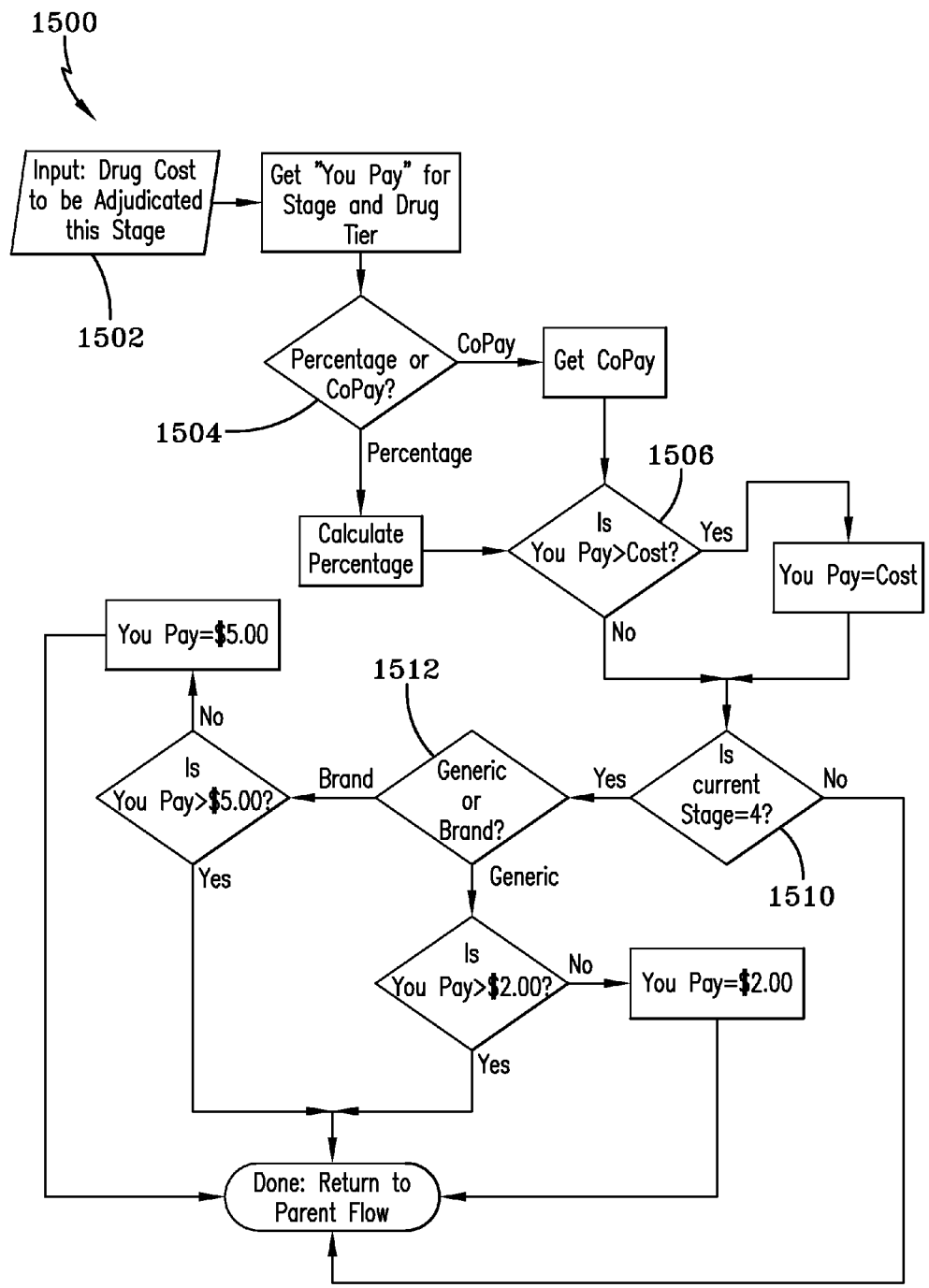
FIG. 15 illustrates the flow for calculating the out-of-pocket drug cost within a given Stage.

FIGS. 13 to 15 illustrate flow charts for calculating the anticipated drug prices for a given user's selection of anticipated drug purchases. The method of these flow charts may be implemented on one or more servers and databases accessible from the Internet by known means.

Basic Flow of Calculator

FIG. 13 illustrates the basic flow of drug price calculation for a Pharmacy Benefits Calculator. In step 1302, a computer user enters their anticipated drug purchases over the next plan year. In step 1304, the list is checked to determine if any of the drugs are not covered by the user's previously selected Pharmacy Benefits Plan. Such drugs in a Medicare Part D plan might include those that would be otherwise covered under Medicare part B.

In step 1306, the drugs are assigned to the months that they will be filled in.

In step 1308, the anticipated adjudicated prices and the anticipated out-of-pocket expenses are calculated. Additional explanation of this step is provided in FIG. 14.

Price Calculation Flow

FIG. 14 shows a flow chart 1400 for the price calculation step 1308 of FIG. 13. This flow is executed for each drug script in the order that said script is scheduled for purchase.

It is important that the calculations for each script are performed in the order the scripts are to be filled in.

The out-of-pocket costs of a computer user will depend upon the order that the drugs are filled in. Consider, for example, the case where a plan deductible is $250 and the Second stage of the plan has an out-of-pocket cost of a $30 copay per script.

The user in this example inputs one fill a first drug A with an anticipated cost of $250, and 5 fills of drug B, each with an anticipated cost of $50. If the user inputs drug A first and drug B second, then their anticipated out-of-pockets costs will be $250 to satisfy the deductible for drug A, plus 5*$30 for each of the copays for drug B. Their total out-of-pocket costs will therefore be $400.

If, however, the user fills the 5 orders of drug B before they fill the order for drug A, then their out-of-pocket costs will be $250 to satisfy the deductible for drug B, plus only one $30 Co-Pay for the single fill of drug A. Thus their total out-of-pocket costs will only be $280.

The flow for calculating the price and out-of-pocket costs for a given drug begins at Get Cost for Drug we are Calculating 1402. As will be discussed in more detail below, in a preferred embodiment, all of the data required for all of the calculations for a given user during a given session is imported from one or more data bases into memory of the server performing said calculations before said calculations begin. This improves the speed of response to the user.

The Drug Cost referred to in FIG. 14 is the AWP less any discounts relevant to the drug. Said discounts may be based on negotiated rates the provider of the Pharmacy Benefits Plan has with various pharmacies, drug companies etc.

The flow then determines 1403 what the Current Stage is as of the last drug calculated. The Current Stage is presumed to be Stage 1 for the first drug.

The flow then determines if the Drug Cost fits into the Current Stage. If so, then Adjudication 1404 is performed. Adjudication is discussed in more detail below with reference to FIG. 15.

The system then increments the Total Drug Cost Accumulator by the amount of the drug cost. This value is used to determine when a computer user moves from Stage 1 to Stage 2 to Stage 3.

The system also increments the Total Retail Out-of-Pocket Accumulator (TROOP Accumulator) by the amount of the user's out-of-pocket costs. This value is used to determine when a computer user moves from Stage 3 to Stage 4.

The system then checks 1406 to see if there are More Drugs to Calculate. If not, then the system Ends the calculation and proceeds to formulate the output page to be presented to the user. This will be discussed in more detail below.

If there are more drugs to calculate, however, then the system returns to the initial step 1402.

If the Current Drug Cost does not fit into the Current Stage, then the system determines 1412 how much of the cost of the Current Drug does fit into the Current Stage. This amount is adjudicated 1414 by the same method as discussed above with reference to FIG. 15.

The system then determines if there is any remaining cost. If so, then the system increments the Stage by one and returns to step 1412.

If there is no remaining cost, then the system performs additional steps according to the benefits structure of a given Pharmacy Benefits Plan. These steps 30 include:

Get the largest Co-Pay for all Stages calculated for this drug;

Sum Percentage coinsurance for all Stages calculated for this drug; and

Sum Co-Pay and Coinsurance to get total "You Pay" for drug.

The system then increments the TROOP and Total Drug Cost Accumulators.

The system then checks to see if there are more drugs. If so then it returns to initial step 1402. If not, then it proceeds to assemble the information required to render the output to the user.

Out-of-Pocket Drug Cost within Stage

FIG. 15 is a flow chart illustrating the flow 1500 for calculating the out-of-pocket drug cost within a given Stage. This flow is entered from steps 1404 and 1414 from the Price Calculation Flow illustrated in FIG. 14.

The flow begins at step 1502. The amount of drug cost to be adjudicated is input and the benefits information (e.g., copay, coinsurance, etc.) is read in from memory where it had been previously stored as discussed above.

The system then determines 1504 if the Benefit of this stage is Percentage coinsurance or a Co-Pay. Either the coinsurance amount is then calculated or the copay is looked up as appropriate. The appropriate value is then designated as the You Pay. For example, if the benefit is a 25% coinsurance and the drug cost is $100, then the You Pay becomes $25. If, on the other hand, the benefit is a $30 copay, then the You Pay becomes $30.

Some Pharmacy Benefits Plans have maximum You Pay for a given drug in a given Stage. For the system illustrated in FIG. 15, the Plan does not require the user to pay more than the minimum of the benefit or the remaining cost of the drug when the user is in Stage 2.

If the remaining cost of a drug was $5, for example, and the You Pay for Stage 2 was a $30 Co-Pay, the user would only be required to pay the lesser of the two, $5.

This contingency is checked for at step 1506 and appropriate action is taken.

Some plans require a minimum You Pay for a given Stage. In the Plan illustrated in FIG. 15, for example, the user must have a certain minimum You Pay if the drug is in Stage 4.

The system first checks 1510 to see if the drug is in Stage 4. If so, it then determines what the minimum You Pay should be. If not, then it is finished with the adjudication and flow is returned to the parent flow illustrated in FIG. 14.

In order to determine the proper minimum You Pay for Stage 4 drugs, the system checks 1512 to see if the drug is Brand or Generic.

If is it Generic, the system checks to see if the You Pay is more than the minimum Co-Pay for a generic, $2. If so, then the You Pay remains unchanged.

If not, then the You Pay is set to the minimum of $2.

Similarly, if the drug is Brand, the system checks to see if the You Pay is more than the minimum Co-Pay for Brand, $5. If so, then the You Pay remains unchanged. If not, then the You Pay is set to the minimum of $5.

In either situation, the system then returns to the parent flow illustrated in FIG. 14.

Figure 16:
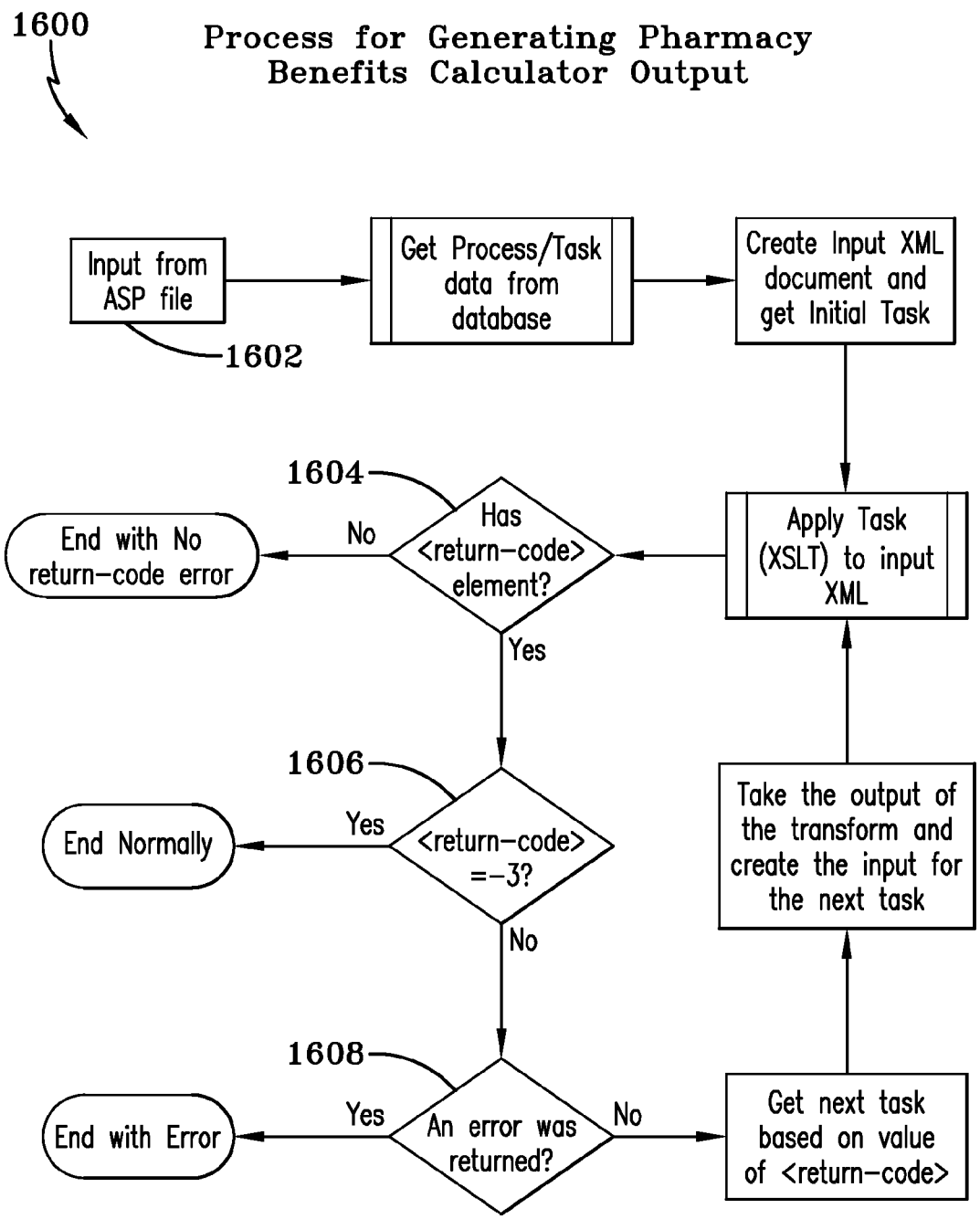
FIG. 16 illustrates a flow chart for a process for creating an output file for rendering Pharmacy Benefits Calculator output.

Process for Creating an Output File for Rendering Pharmacy Benefits Calculator Output Basic Flow for Creating an Output File FIG. 16 illustrates a flow chart for a process for creating an output file for rendering Pharmacy Benefits Calculator output. The file may be an HTML file or other rendering protocol.

The process initiates with input 1602 from an ASP file, such as a request from a computer user's terminal.

The system then gets process/task data from a process/task database.

The system then creates an initial Input XML document and gets an initial Task appropriate to the input document.

The system then applies the task and transforms the input XML document into an output XML document using an XSLT transformation.

The output XML document comprises a <return-code> element (or other element by another name that serves the same function).

The system then checks 1604 to see if the <return-code> is present. If not, then an error is output.

If so, then the system checks 1606 to see if the value of the <return-code> indicates that the process is complete. If so then the system ends normally.

If not, then it checks 1608 to see if an error has occurred. If so, then it ends with an error message.

If not, then the system then gets the next task based on the value of the <returncode>.

The system then performs the next task using the output XML document from the previous task as the input XML document for said next task.

The system then applies the appropriate XSLT transform to the XML document to transform it to the next output XML document.

Ultimately the XML document is transformed into an output document, such as an HTML document. When the system ends normally, the output HTML document is returned to the user and is used by the user's work station to render the output.

Example of Transforming an Input XML file to an Output HTML File.

Appendices C0 to C8 of provisional application 60/829,528 illustrate an example of successive transformations of an initial XML file into a final HTML file using the method described above.

A computer user accessed a Pharmacy Benefits Calculator and input sufficient personal information to determine the plans he was eligible for along with a set of anticipated drug purchases. The drugs are presented in Table 3.

TABLE 3

| Drug Name | Retail/Mail | # Fills |
| --- | --- | --- |
| Actonel 30 mg Tablet | Retail | 12 |
| Toprol XL 100 mg Tablet SA | Mail | 4 |
| Paroxetine HCL 10 mg Tablet | Retail | 12 |
| Lipitor 10 mg Tablet | Mail | 4 |
| Levothyroxine 100 mcg Tablet | Retail | 12 |

An initial XML file was generated and underwent eight transformations to become the output HTML file. These transformations are described in Table 4. The output file renders a View Monthly Drug Cost page similar in format to the one illustrated in FIGS. 4A to 4G.

The user could only capture one XML file per run, so the same run was repeated to get each XML file in said Appendices.

TABLE 4

| Transformation | Retail/Mail # Fills | |
| --- | --- | --- |
| Input | C0 | Plans available to user are identified as <planname> |
| Session Checking | C1 | Elapsed time for task is captured in <outputhistory>. Subsequent transformations will record elapsed time as <task-time-elapsed-ms> for each task. |
| Get Plan Info | C2 | This is the most time consuming task. It requires the Benefits information for each plan to be read in from a remote database into the server memory. The Benefits information is used to determine how a drug adjudicates in each Stage of the plan. |

TABLE 4-continued

| Transformation | Retail/Mail # Fills | |
| --- | --- | --- |
| Get Pricing Data | C3 | The AWP for each drug and other pricing information is read in from a drug pricing database. |
| Calc Costs | C4 | The pricing for each fill of each drug is adjudicated in the order the drugs are scheduled for purchase. This is done according to the method outlined in FIGS. 13, 14, 15 |
| Create Monthly Cost Display | C5 | This begins the creation of the HTML code used to render the page. A monthly drug pricing table is laid out similar to item 420 in FIG. 4 |
| Insert Page Scripts and Headers | C6 | Additional HMTL code is added to cover rendering of the header etc. |
| Create CSS styles for HTML Display | C7 | Additional code is added |
| Log Hits and output HTML Display | C8 | HTML is sent to the user's workstation |

A surprising advantage of performing the tasks in the method described above is the short elapsed time of execution. The elapsed time for the run illustrated in Appendix 8 for example, was 0.34 seconds. The server used to perform the calculation had about 1/3 the speed of the server farm used in actual production.

Example of Providing a Pharmacy Benefits Calculator to a Medicare Eligible Population.

An embodiment of a Pharmacy Benefits Calculator A was presented to the Medicare eligible or nearly eligible population of the United States as a subdomain within a Health Plan Wizard according to FIG. 12. Over the course of 89 days, the Pharmacy Benefits Calculator received an average of 530,000 hits per day with a peak of 880,000 hits per day.

Conclusion

One of skill in the art will recognize that insurance is a regulated industry. One practicing the methods described and claimed herein will want to maintain compliance with all applicable local, state and federal regulations, to ensure that the insurance policy is properly presented to the insured, premiums are properly approved, underwriting properly occurs, all necessary regulatory approvals are in place, etc.

While particular embodiments of the present invention have been illustrated and described, it would be obvious to those skilled in the art that various other changes and modifications can be made without departing from the spirit and scope of the invention. Any of the aspects of the invention of the present invention found to offer advantages over the state of the art may be used separately or in any suitable combination to achieve some or all of the benefits of the invention disclosed herein.

The invention claimed is:

1. A computerized method for calculating and displaying to a computer user anticipated out-of-pocket pharmacy costs under at least one Medicare Part D pharmacy benefit plan, comprising:
   a) receiving at a server from said computer user prescription data for a plurality of drugs, said prescription data comprising a drug identifier and a number of fills during a plan period;
   b) defining at said server a schedule for purchasing said drugs, said schedule comprising:
      1) for each month of said plan period, drug fills assigned to said month; and
      2) a number of drug fills for one month that differs from a number of drug fills for another month;
   c) calculating at said server an anticipated out-of-pocket cost for each drug fill according to said schedule of drug fill assignments wherein calculating an anticipated out-of-pocket cost for each drug fill comprises:
      i) applying simulated adjudication to each drug fill to determine a cost for said drug fill under said at least one Medicare Part D pharmacy benefit plan according to said schedule;
      ii) identifying at least one Medicare Part D stage applicable to said drug fill;
      iii) determining an anticipated out-of-pocket cost for said drug fill according to each applicable Medicare Part D stage;
      iv) storing data for said anticipated out-of-pocket cost for said drug fill according to said assignments;
      v) repeating steps i-iv for each drug fill; and
   d) generating at said server for display to said computer user anticipated out-of-pocket costs for said plan period according to said schedule by:
      i) presenting for each applicable month of said plan period an anticipated out-of-pocket cost for each drug fill assigned to said month; and
      ii) presenting in association with each applicable month an indicator of whether more than one Medicare Part D stage is applicable to said month.

2. The computerized method of claim 1 further comprising prompting said computer user to change an order of said plurality of drugs specified in said prescription data.

3. The computerized method of claim 2 further comprising:
   e) receiving at said server from said computer user in a new order each of said plurality of drugs in said prescription data;
   f) defining at said server a new schedule for purchasing said drugs by assigning according to said new order each drug fill to a month in which said drug fill is anticipated to be purchased during said plan period;
   g) calculating and storing at said server a new anticipated out-of-pocket cost by calculating an anticipated out-of-pocket cost for each drug fill according to said new schedule; and
   h) generating at said server for display to said computer user anticipated out-of-pocket costs for said plan period organized according to said new schedule and comprising for each applicable month of said plan period an anticipated out-of-pocket cost for each drug fill.

4. The computerized method of claim 1 wherein:
presenting in association with each applicable month an indicator of whether more than one Medicare Part D stage is applicable to said month comprises indicating when a new Medicare Part D stage begins.

5. The computerized method of claim 4 wherein:
presenting in association with each applicable month an indicator of whether more than one Medicare Part D stage is applicable to said month comprises presenting a number for said Medicare Part D stage applicable to said month.

6. The computerized method of claim 1 wherein said plan period is one year.

7. The computerized method of claim 1 further comprising:
   e) receiving at said server from said computer user pharmacy provider information for each of said plurality of drugs;
   f) determining at said server an anticipated out-of-pocket cost for each drug fill under said at least one Medicare Part D pharmacy benefit plan according to said pharmacy provider information; and g) generating at said server for display to said computer user anticipated out-of-pocket costs for each drug fill under said at least one Medicare Part D pharmacy benefit plan according to said pharmacy provider information.

8. The computerized method of claim 1 further comprising:

e) calculating at said server anticipated out-of-pocket costs for a second Medicare Part D pharmacy benefit plan; and f) presenting to said computer user a comparison of anticipated out-of-pocket costs for said Medicare Part D pharmacy benefit plan and said second Medicare Part D pharmacy benefit plan, where applicable.

9. A computerized method for calculating and displaying anticipated out-of-pocket pharmacy costs to a computer user under at least one Medicare Part D pharmacy benefit plan, comprising:

a) receiving at a server from said computer user prescription data for a plurality of drugs, said prescription data comprising a drug identifier and a number of fills during a plan period;

b) defining at said server a schedule for purchasing said drugs, said schedule comprising:
  1) for each month of said plan period, drug fills assigned to said month; and
  2) a number of drug fills for one month that differs from a number of drug fills for another month;

c) calculating and storing at said server an anticipated out-of-pocket cost for each drug fill according to said schedule of drug fill assignments by:
  i) applying simulated adjudication to each drug fill to determine for each drug fill an anticipated cost under said at least one Medicare Part D pharmacy benefit plan according to said schedule;
  ii) identifying at least one Medicate Part D stage applicable to said drug fill; and
  Iii) determining an anticipated out-of-pocket cost for said drug fill according to each applicable Medicare Part D stage;

d) calculating and storing at said server for each month of said plan period a total anticipated out-of-pocket cost by summing for each month of said plan period an anticipated out-of-pocket cost for each drug fill anticipated to be purchased during said month; and e) generating at said server for display to said computer user a list of month-by-month anticipated out-of-pocket costs for applicable months of said plan period wherein said list comprises:
  i) an identifier for a month;
  ii) an anticipated out-of-pocket cost for said month; and
  iii) an indicator for a Medicare Part D stage applicable to said month.

10. The computerized method of claim 9 wherein said indicator for a Medicare Part D stage is a numerical stage identifier.

11. The computerized method of claim 9 further comprising:

f) identifying at said server alternative drugs, if applicable, for each of said plurality of drugs received in said prescription data from said computer user;

g) assigning at said server a drug fill for each fill of said plurality of alternative drugs to a month in which alternative drug fill is anticipated to be purchased during said plan period;

h) calculating and storing at said server an anticipated out-of-pocket cost for each alternative drug fill according to said assignments by determining anticipated out-of-pocket costs for each said alternative drug fill according to at least one Medicare Part D stage applicable to said drug fill;

i) calculating and storing at said server a monthly total anticipated out-of-pocket cost for each month of said plan period by summing for each month of said plan period an anticipated out-of-pocket cost for each alternative drug fill according to said assignments; and j) generating at said server for display to said computer user:
  i) a list comprising for each applicable month of said plan period:
    A) an identifier for said month;
    B) an anticipated out-of-pocket cost for said month based on said alternative drug fill for said month;
    C) an indicator for a Medicare Part D stage applicable to said month; and
  ii) a benefit to said computer user related to purchasing said alternative drug fill.

12. The computerized method of claim 9 further comprising:

f) identifying at said server an alternative source for at least one of said plurality of drugs received in said prescription data from said computer user;

g) assigning at said server a drug fill for each fill of said at least one of said plurality of drugs to a month in which said drug fill is anticipated to be purchased during said plan period;

h) calculating and storing at said server an anticipated out-of-pocket cost for each drug fill according to said assignments of each drug fill by determining out-of-pocket costs for each said drug fill according to at least one Medicare Part D stage applicable to said drug fill and said alternative source for said at least one of said plurality of drugs;

i) calculating and storing at said server a monthly total anticipated out-of-pocket cost for each month of said plan period by summing for each month of said plan period an anticipated out-of-pocket cost for each drug fill according to said assignments of each drug fill to a month in which each drug fill is anticipated to be purchased during said plan period; and j) generating at said server for display to said computer user:
  i) a list of month-by-month anticipated out-of-pocket costs for all applicable months of said plan period, said list comprising for each month:
    A) an identifier for said month;
    B) an anticipated out-of-pocket cost for said month based on said drug fills for said month;
    C) an indicator for a Medicare Part D stage applicable to said month; and
  ii) a benefit to said computer user related to purchasing said at least one drug from said alternative source.

13. The computerized method of claim 9 further comprising:

f) generating at said server for display to said computer user a total out-of- pocket cost for said plan period wherein said total out-of-pocket cost is a sum of said anticipated out-of-pocket cost for each drug fill in each applicable month of said plan period.

14. The computerized method of claim 9 wherein said plan period is up to one year.

15. A computerized method for calculating and displaying anticipated out-of-pocket pharmacy costs to a computer user under at least one Medicare Part D pharmacy benefit plan, comprising:
- a) receiving at a server from said computer user prescription data for a plurality of drugs, said prescription data comprising a drug identifier and a number of fills during a plan period;
- b) defining at said server a schedule for purchasing said plurality of drugs, said schedule comprising:
  - 1) for each month of said plan period, drug fills assigned to said month; and
  - 2) a number of drug fills for one month that differs from a number of drug fills for another month;
- c) calculating at said server an anticipated out-of-pocket cost for each drug fill according to said schedule of drug fill assignments wherein calculating an anticipated out-of-pocket cost comprises:
  - i) applying simulated adjudication to determine at said server a cost for said drug fill under said at least one Medicare Part D pharmacy benefit plan according to said schedule;
  - ii) identifying at said server at least one Medicare Part D stage applicable to said drug fill;
  - iii) determining at said server an anticipated out-of-pocket cost for said drug fill according to each applicable Medicare Part D stage;
  - iv) storing at said server data for said anticipated out-of-pocket cost for each drug fill according to said assignments;
  - v) repeating steps i-iv for each drug fill; and
- d) generating at said server for display to said computer user according to said schedule month-by-month anticipated out-of-pocket costs organized in a table comprising:
  - i) a listing of months for said plan period;
  - ii) a list of drug fills for each month;
  - iii) an anticipated out-of-pocket cost for each drug fill; and
  - iv) an indicator of whether more than one Medicare Part D stage is applicable to said drug fills for said month.

16. The computerized method of claim 15 wherein said table further comprises a running total of out-of-pockets costs for each drug fill.

17. The computerized method of claim 15 wherein said indicator of a Medicare Part D stage comprises an indicator for a beginning of a Medicare Part D stage.

18. The computerized method of claim 17 wherein said indicator for a beginning of a Medicare Part D stage is identified by stage.

19. The computerized method of claim 15 wherein said indicator of a Medicare Part D stage appears in a table cell based on anticipated out-of-pocket cost for a drug fill.

20. The computerized method of claim 15 further comprising:
- e) receiving at said server from said computer user in a new order each of said plurality of drugs in said prescription data;
- f) assigning a drug fill to a month according to a new schedule consistent with said new order for purchasing said plurality of drugs;
- g) calculating and storing at said server a new anticipated out-of-pocket cost by calculating an anticipated out-of-pocket cost for each drug fill according to said new schedule; and
- h) generating at said server for display to said computer user anticipated out-of-pocket costs for said plan period organized according to said new schedule and comprising for each applicable month of said plan period an anticipated out-of-pocket cost for each drug fill.

21. A computerized method for calculating and displaying to a computer user anticipated out-of-pocket pharmacy costs under at least one Medicare Part D pharmacy benefit plan, comprising:
- a) receiving at a server from said computer user prescription data for a plurality of drugs, said prescription data comprising a drug identifier and a number of fills during a plan period;
- b) defining at said server a schedule for purchasing said drugs, said schedule comprising:
  - 1) for each month of said plan period, drug fills assigned to said month; and
  - 2) a number of drug fills for one month that differs from a number of drug fills for another month;
- c) simulating adjudication of each drug fill assignment to calculate at said server an anticipated out-of-pocket cost for each drug fill under said at least one Medicare Part D pharmacy benefit plan according to said schedule;
- d) generating at said server for display to said computer user anticipated out-of-pocket costs for said plan period according to said schedule by:
  - i) presenting for each applicable month of said plan period an anticipated out-of-pocket cost for each drug fill assigned to said month; and
  - ii) presenting in association with each applicable month an indicator of at least one Medicare Part D stage applicable to said month.

22. The computerized method of claim 21 further comprising prompting said computer user to change an order of said plurality of drugs specified in said prescription data.

23. The computerized method of claim 22 further comprising:
- e) receiving at said server from said computer user in a new order each of said plurality of drugs in said prescription data;
- f) defining at said server a new schedule for purchasing said drugs by assigning according to said new order each drug fill to a month in which said drug fill is anticipated to be purchased during said plan period;
- g) simulating adjudication of each drug fill assignment to calculate at said server an anticipated out-of-pocket cost for each drug fill according to said new schedule; and
- h) generating at said server for display to said computer user anticipated out-of-pocket costs for said plan period organized according to said new schedule and comprising for each applicable month of said plan period an anticipated out-of-pocket cost for each drug fill.

24. The computerized method of claim 21 wherein:
presenting in association with each applicable month an indicator of at least one Medicare Part D stage is applicable to said month comprises indicating when a new Medicare Part D stage begins.

25. The computerized method of claim 24 wherein:
presenting in association with each applicable month an indicator of whether at least one Medicare Part D stage is applicable to said month comprises presenting a number for said Medicare Part D stage applicable to said month.

26. The computerized method of claim 21 wherein said plan period is one year.

27. The computerized method of claim 21 further comprising:
- e) receiving at said server from said computer user pharmacy provider information for each of said plurality of drugs;
- f) determining at said server an anticipated out-of-pocket cost for each drug fill under said at least one Medicare Part D pharmacy benefit plan according to said pharmacy provider information; and
- g) generating at said server for display to said computer user anticipated out-of-pocket costs for each drug fill under said at least one Medicare Part D pharmacy benefit plan according to said pharmacy provider information.

28. The computerized method of claim 21 further comprising:
- e) calculating at said server anticipated out-of-pocket costs for a second Medicare Part D pharmacy benefit plan; and
- f) presenting to said computer user a comparison of anticipated out-of-pocket costs for said Medicare Part D pharmacy benefit plan and said second Medicare Part D pharmacy benefit plan, where applicable.

* * * * *